United States Patent
Miyaoka et al.

(10) Patent No.: US 10,162,404 B2
(45) Date of Patent: Dec. 25, 2018

(54) CONTROL APPARATUS, CONTROL METHOD, CABLE, ELECTRONIC APPARATUS, AND COMMUNICATION APPARATUS WITH INCREASED VARIATION OF CONNECTION MODE

(71) Applicant: SONY SEMICONDUCTOR SOLUTIONS CORPORATION, Kanagawa (JP)

(72) Inventors: Hirosada Miyaoka, Kanagawa (JP); Katsuhisa Ito, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 203 days.

(21) Appl. No.: 15/028,138

(22) PCT Filed: Oct. 3, 2014

(86) PCT No.: PCT/JP2014/076506
§ 371 (c)(1),
(2) Date: Apr. 8, 2016

(87) PCT Pub. No.: WO2015/056581
PCT Pub. Date: Apr. 23, 2015

(65) Prior Publication Data
US 2016/0239075 A1      Aug. 18, 2016

(30) Foreign Application Priority Data
Oct. 18, 2013  (JP) ................................. 2013-217007
Mar. 12, 2014  (JP) ................................. 2014-048427

(51) Int. Cl.
*G06F 1/32*  (2006.01)
*G06F 1/26*  (2006.01)
(Continued)

(52) U.S. Cl.
CPC .............. *G06F 1/3287* (2013.01); *G06F 1/26* (2013.01); *G06F 1/266* (2013.01); *G06F 1/324* (2013.01);
(Continued)

(58) Field of Classification Search
None
See application file for complete search history.

(56) References Cited

U.S. PATENT DOCUMENTS 5,375,051 A * 12/1994 Decker ................ G06F 1/3215
                                                                363/49
5,606,314 A *  2/1997 Mitsuhashi ........... G06F 13/387
                                                                340/13.29
(Continued)

FOREIGN PATENT DOCUMENTS

JP        6-29899 A       2/1994
JP      11-112524 A       4/1999
JP     2012-008716        1/2012

OTHER PUBLICATIONS

Wayback Machine Capture of Carrier Wave, Wikipedia, captured Nov. 14, 2012 (Year: 2012).*
(Continued)

*Primary Examiner* — Paul Yen
*Assistant Examiner* — Danny Chan
(74) *Attorney, Agent, or Firm* — Sheridan Ross P.C.

(57) ABSTRACT

The present technology relates to a control apparatus, a control method, a cable, an electronic apparatus, and a communication apparatus that are capable of increasing the variation of a connection mode of an electronic apparatus to which a predetermined cable such as a USB cable can be connected. An electronic apparatus receiving a baseband signal of a baseband to start initialization processing for causing the electronic apparatus to be in a state of being capable of establishing connection or to turn on or off a (Continued)

power source based on detection results of power of a modulation signal obtained by frequency-converting the baseband signal into a signal of a predetermined frequency band higher than the baseband is controlled. The present technology can be applied to a cable connected to an electronic apparatus to which a cable capable of supplying a power source by bus power such as a USB cable.

18 Claims, 17 Drawing Sheets

(51) Int. Cl.
  *G06F 13/38* (2006.01)
  *G06F 13/42* (2006.01)
(52) U.S. Cl.
  CPC ........ *G06F 13/385* (2013.01); *G06F 13/4282* (2013.01)

(56) References Cited

U.S. PATENT DOCUMENTS

| | | | | |
|---|---|---|---|---|
| 8,005,441 B1* | 8/2011 | Khlat | ................... | H03G 3/3042 455/108 |
| 8,781,147 B1* | 7/2014 | Giuroiu | ................ | H04R 1/1091 381/309 |
| 2001/0046304 A1* | 11/2001 | Rast | ..................... | H04R 1/1041 381/74 |
| 2003/0070103 A1* | 4/2003 | Kim | .......................... | G06F 1/26 713/300 |
| 2004/0097212 A1* | 5/2004 | Matsumoto | .......... | H03G 3/3068 455/296 |
| 2005/0197080 A1* | 9/2005 | Ulupinar | ............... | H04B 7/0877 455/135 |
| 2008/0057857 A1* | 3/2008 | Smith | ................... | H04R 1/1033 455/3.05 |
| 2009/0031147 A1* | 1/2009 | Horvat | .................... | H02J 9/005 713/300 |
| 2012/0300875 A1* | 11/2012 | Kwon | ................. | H04L 25/0384 375/295 |
| 2013/0031392 A1 | 1/2013 | McLane | | |

OTHER PUBLICATIONS

International Search Report prepared by the Japanese Patent Office dated Oct. 30, 2014, for International Application No. PCT/JP2014/076506.

* cited by examiner

CONTROL APPARATUS, CONTROL METHOD, CABLE, ELECTRONIC APPARATUS, AND COMMUNICATION APPARATUS WITH INCREASED VARIATION OF CONNECTION MODE

CROSS REFERENCE TO RELATED APPLICATIONS

This application is a national stage application under 35 U.S.C. 371 and claims the benefit of PCT Application No. PCT/JP2014/076506 having an international filing date of 3 Oct. 2014, which designated the United States, which PCT application claimed the benefit of Japanese Patent Application No. 2013-217007 filed 18 Oct. 2013 and Japanese Patent Application No. 2014-048427 filed 12 Mar. 2014, the disclosures of which are incorporated herein by reference in their entirety.

TECHNICAL FIELD

The present technology relates to a control apparatus, a control method, a cable, an electronic apparatus, and a communication apparatus, and particularly to a control apparatus, a control method, a cable, an electronic apparatus, and a communication apparatus that are capable of increasing the variation of a connection mode of an electronic apparatus to which a predetermined cable such as a USB (Universal Serial Bus) cable can be connected.

BACKGROUND ART

Examples of the electronic apparatus to which a USB cable can be connected include (an electronic apparatus serving as) a USB host and (an electronic apparatus serving as) a USB device.

In the case of a USB host and a USB device connected through a USB cable, the USB host mainly controls the communication between the USB host and the USB device.

The USB supports the bus power(ed) mode, and thus, a power source as well as a signal (data) can be supplied from the USB host to the USB device through the USB cable.

It should be noted that in the case of the USB, the upper limit of current that can be supplied as a power source through one USB cable is specified. In this regard, a technique that supplies a power source from the USB host to the USB device whose current consumption exceeds the specified upper limit of the USB has been proposed (see, for example, Patent Document 1).

CITATION LIST

Patent Document

Patent Document 1: Japanese Patent Application Laid-open No. 2012-008716

SUMMARY OF INVENTION

Problem to be Solved by the Invention

Incidentally, the variation of a connection mode of an electronic apparatus to which a predetermined cable such as a USB cable can be connected is expected to increase.

The present technology has been made in view of the above circumstances to increase the variation of a connection mode of the electronic apparatus.

Means for Solving the Problem

The control apparatus according to the present technology is an apparatus including a controller configured to control an electronic apparatus receiving a baseband signal of a baseband to start initialization processing for causing the electronic apparatus to be in a state of being capable of establishing connection or to turn on or off a power source based on detection results of power of a modulation signal obtained by frequency-converting the baseband signal into a signal of a predetermined frequency band higher than the baseband.

The control method according to the present technology is a control method including controlling an electronic apparatus receiving a baseband signal of a baseband to start initialization processing for causing the electronic apparatus to be in a state of being capable of establishing connection or to turn on or off a power source based on detection results of power of a modulation signal obtained by frequency-converting the baseband signal into a signal of a predetermined frequency band higher than the baseband.

The cable according to the present technology is a cable connected to an electronic apparatus to which a bus power cable capable of supplying a power source by bus power can be connected, the cable including a reception unit configured to receive a modulation signal obtained by frequency-converting a baseband signal of a baseband into a signal of a predetermined frequency band higher than the baseband, and to frequency-convert it into the baseband signal, a power detection unit configured to detect power of the modulation signal received by the reception unit, and a controller configured to control the electronic apparatus receiving the baseband signal to start initialization processing for causing the electronic apparatus to be in a state of being capable of establishing connection or to turn on or off a power source based on detection results of the power of the modulation signal in the power detection unit.

The electronic apparatus according to the present technology is an electronic apparatus to which a bus power cable capable of supplying a power source by bus power can be connected, the electronic apparatus including a reception unit configured to receive a modulation signal obtained by frequency-converting a baseband signal of a baseband into a signal of a predetermined frequency band higher than the baseband, and to frequency-convert it into the baseband signal, a power detection unit configured to detect power of the modulation signal received by the reception unit, and a controller configured to control the electronic apparatus receiving the baseband signal to start initialization processing for causing the electronic apparatus to be in a state of being capable of establishing connection or to turn on or off a power source based on detection results of the power of the modulation signal in the power detection unit.

In the control apparatus, the control method, the cable, and the electronic apparatus according to the present technology, an electronic apparatus receiving a baseband signal of a baseband to start initialization processing for causing the electronic apparatus to be in a state of being capable of establishing connection or to turn on or off a power source based on detection results of power of a modulation signal obtained by frequency-converting the baseband signal into a signal of a predetermined frequency band higher than the baseband is controlled.

The communication apparatus according to the present technology is a communication apparatus including a transmission unit configured to transmit a modulation signal obtained by frequency-converting a baseband signal of a baseband into a signal of a predetermined frequency band higher than the baseband to an apparatus configured to receive the modulation signal, to detect power of the modulation signal, and to control an electronic apparatus receiving the baseband signal to start initialization processing for causing the electronic apparatus to be in a state of being capable of establishing connection or to turn on or off a power source based on detection results of the power of the modulation signal, and a controller configured to control on and off of transmission of the modulation signal.

The different control method according to the present technology is a control method including controlling on and off of transmission of a modulation signal obtained by frequency-converting a baseband signal of a baseband into a signal of a predetermined frequency band higher than the baseband to an apparatus configured to control an electronic apparatus, the electronic apparatus being configured to receive the modulation signal, to detect power of the modulation signal, and to control the electronic apparatus receiving the baseband signal to start initialization processing for causing the electronic apparatus to be in a state of being capable of establishing connection or to turn on or off a power source based on detection results of the power of the modulation signal.

In the communication apparatus and the different control method according to the present technology, on and off of transmission of a modulation signal obtained by frequency-converting a baseband signal of a baseband into a signal of a predetermined frequency band higher than the baseband to an apparatus configured to control an electronic apparatus, is controlled, the electronic apparatus being configured to receive the modulation signal, to detect power of the modulation signal, and to control the electronic apparatus receiving the baseband signal to start initialization processing for causing the electronic apparatus to be in a state of being capable of establishing connection or to turn on or off a power source based on detection results of the power of the modulation signal.

It should be noted that the control apparatus and the communication apparatus may each be an independent apparatus, and may be an internal block constituting one apparatus.

Effects of the Invention

According to the present technology, it is possible to increase the variation of a connection mode of an electronic apparatus.

It should be noted that effects described herein are not necessarily limited, and may be any one of the effects described in the present disclosure.

MODES FOR PERFORMING THE INVENTION

<Communication System in which Electronic Apparatuses are Connected to Each Other Through USB Cable>

Figure 1:
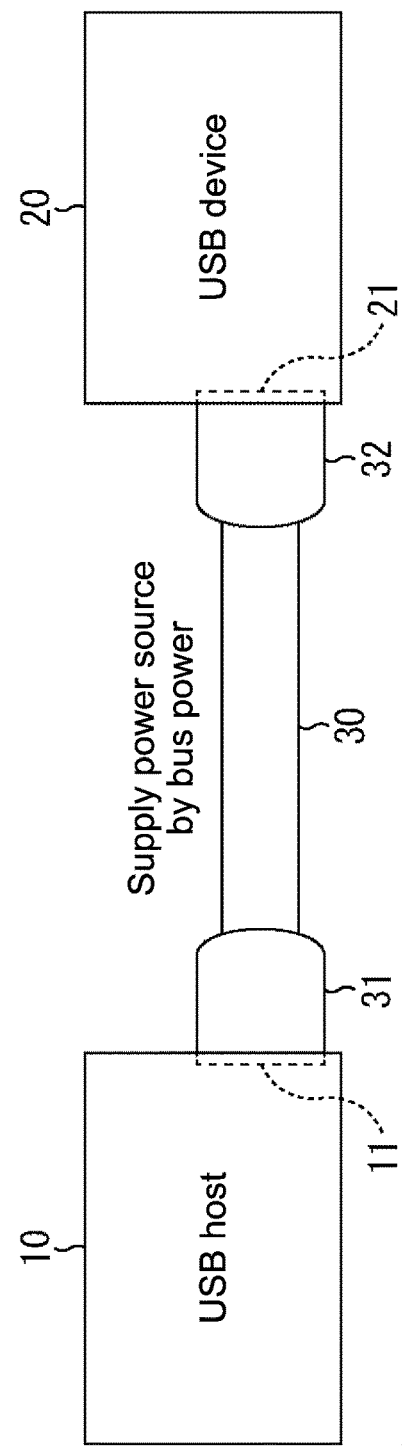
FIG. 1 A diagram showing a configuration example of a communication system in which electronic apparatuses are connected to each other through a USB cable.

FIG. 1 is a diagram showing a configuration example of a communication system in which electronic apparatuses are connected to each other through a USB cable.

In the communication system shown in FIG. 1, a USB host 10 and a USB device 20 are connected to each other through a USB cable 30.

The USB host 10 is an electronic apparatus having at least a function of serving as a USB host, which operates by being supplied with a power source uniquely (not by bus power) from an external power source, or being supplied with a power source from an incorporated battery, such as a PC (Personal Computer) and a digital camera.

The USB host 10 includes a USB connector (socket) (receptacle) 11 that can be connected to a USB connector (plug) 31 of the USB cable 30. In FIG. 1, the USB connector 31 is inserted in the USB connector 11, thereby connecting the USB connectors 11 and 31 to each other.

The USB device 20 is an electronic apparatus having at least a function of serving as a USB device, which operates by being supplied with a power source by bus power, such as a disc drive.

The USB device 20 includes a USB connector (socket) (receptacle) 21 that can be connected to a USB connector (plug) 32 of the USB cable 30. In FIG. 1, the USB connector 32 is inserted in the USB connector 21, thereby connecting the USB connectors 21 and 32 to each other.

The USB cable 30 is a cable that conforms to the USB standards. To one end of the USB cable 30, the USB connector 31 to be connected to the USB host 10 is provided. To the other end of the USB cable 30, the USB connector 32 to be connected to the USB device 20 is provided.

It should be noted that the USB device 20 and the USB cable 30 can be integrally formed with each other so that the side of the USB connector 32 of the USB cable 30 is always connected to the USB device 20.

Figure 2:
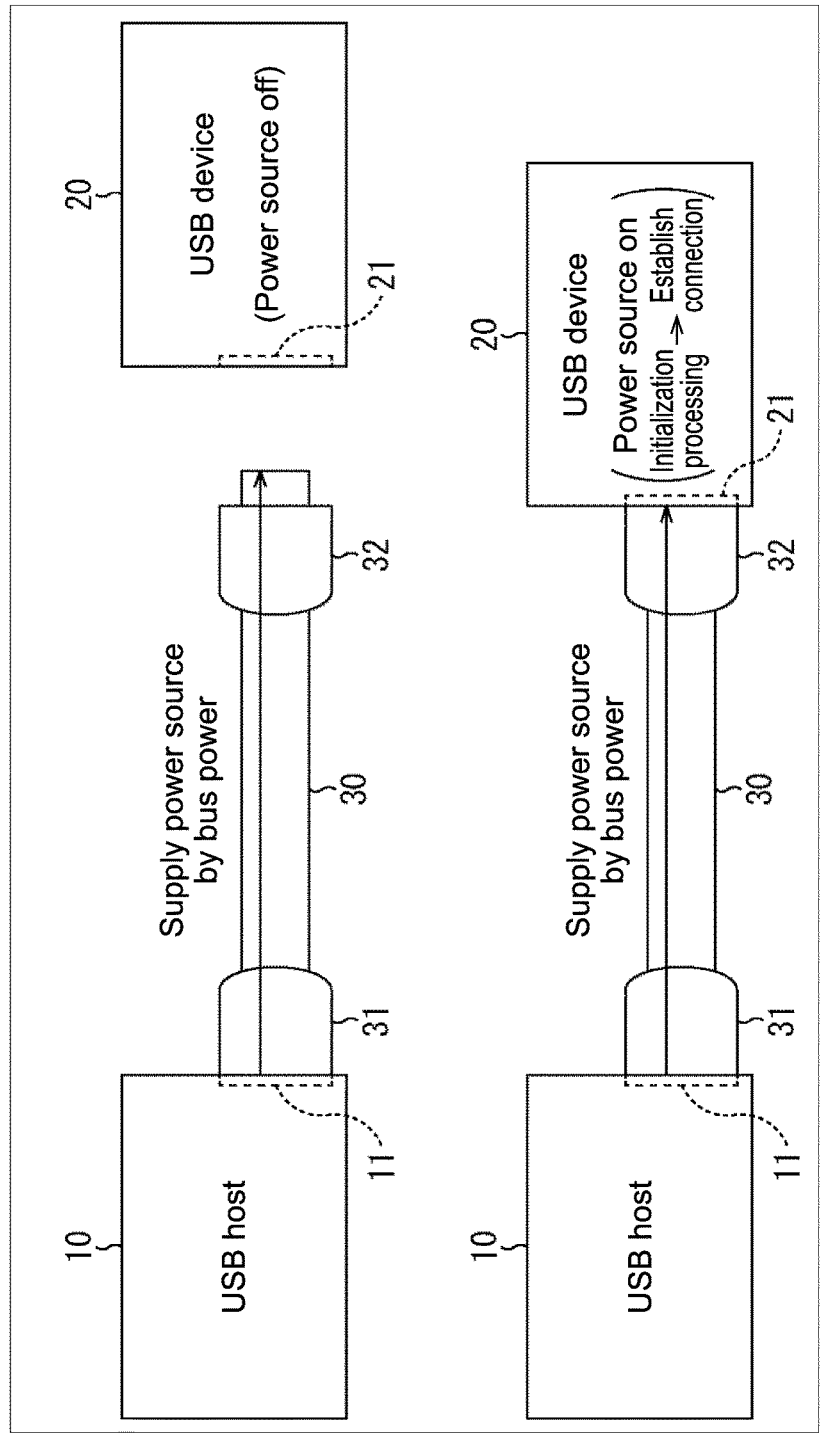
FIG. 2 A diagram for explaining the operation of the communication system.

FIG. 2 is a diagram for explaining the operation of the communication system shown in FIG. 1.

The power source of the USB device 20 is off, in the state where the USB device 20 is not connected to the USB host 10 through the USB cable 30.

If the USB device 20 is connected to the USB host 10 through the USB cable 30, power source supply from the USB host 10 to the USB device 20 by bus power through the USB cable 30 is started.

If the power source supply by bus power is started, the power source of the USB device 20 is turned on. After that, in the USB device 20, initialization processing for causing the USB device 20 to be in the state of being capable of establishing connection is started to communicate with (transmit data to) the USB host 10 with the turning on of the power source as a trigger.

After the initialization processing is finished, connection between the USB device 20 and the USB host 10 is established, and the data transmission is started.

<Communication System that Transmits Data with Modulation Signal of Extremely High Frequency>

Figure 3:
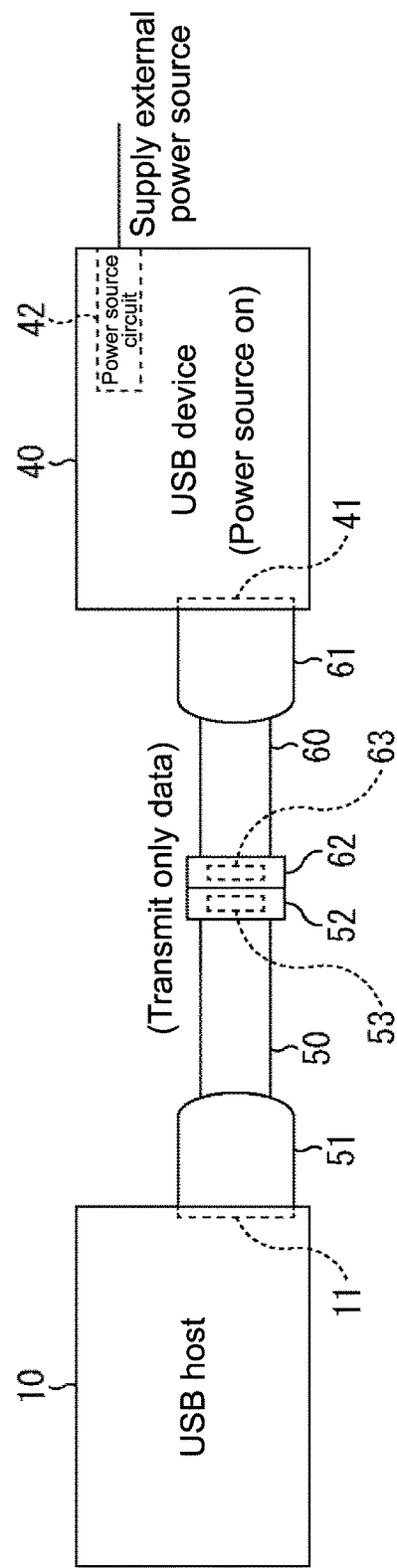
FIG. 3 A diagram showing a configuration example of a communication system that transmits data with a modulation signal of extremely high frequency.

FIG. 3 is a diagram showing a configuration example of a communication system that transmits data with a modulation signal of extremely high frequency.

It should be noted that in the figure, the same components as those in FIG. 1 will be denoted by the same reference numerals and a description thereof will be omitted appropriately.

The communication system shown in FIG. 3 is the same as that in FIG. 1 in that the communication system includes the USB host 10.

It should be noted that the communication system shown in FIG. 3 is different from that in FIG. 1 in that a USB device 40 is provided instead of the USB device 20 and millimeter wave cables 50 and 60 are provided instead of the USB cable 30.

Here, the (modulation) signal of extremely high frequency is a signal having a frequency of about 30 to 300 GHz, i.e., wavelength of about 1 to 10 mm. According to the signal of extremely high frequency, data can be transformed at a high data rate because the frequency of the signal is high, and wireless communication (wireless transmission) can be performed using free space as a transmission path with a small antenna. In addition, according to the signal of extremely high frequency, communication using a dielectronic such as a metallic line and plastic as a transmission path can be performed.

The USB device 40 is an electronic apparatus having at least a function of serving as a USB device, which operates by being supplied with a power source uniquely from an external power source, or being supplied with a power source from an incorporated battery, such as a digital camera and a printer.

In this embodiment, the USB device 40 includes a power source circuit 42. The power source circuit 42 generates a power source of voltage appropriate for the USB device 40 from the external power source and supplies it to a necessary block (not shown) constituting the USB device 40.

In addition, the USB device 40 includes a USB connector 41 that is the same as the USB connector 21 of the USB device 20 shown in FIG. 1.

Therefore, the USB cable 30 can be connected to the USB connector 41 of the USB device 40 as in the case of the USB device 20 shown in FIG. 1. In the case where the USB host 10 and the USB device 40 are connected to each other through the USB cable 30, the USB device 40 operates without being supplied with a power source from the USB host 10 by bus power.

In the communication system shown in FIG. 3, a USB connector 61 of the millimeter wave cable 60 is inserted in the USB connector 41 of the USB device 40, thereby establishing connection.

The millimeter wave cable 50 is a cable having one end to which a USB connector 51 to be connected to the USB host 10 is provided and the other end to which a millimeter wave connector 52 to be fitted with a millimeter wave connector 62 is provided.

In the millimeter wave cable 50, the USB connector 51 and a line (connection line) between the USB connector 51 and the millimeter wave cable 52 are configured to be the same as the USB connector 31 of the USB cable 30 and a line between the USB connectors 31 and 32 shown in FIG. 1, respectively.

The millimeter wave cable 52 has a communication unit 53 therein, which performs communication with a modulation signal (RF (Radio Frequency) signal) of extremely high frequency.

The communication unit 53 frequency-converts a differential signal, which is a baseband signal (signal of baseband) supplied from the USB host 10 via a terminal for data transmission (e.g., so-called +D and −D terminals in the case of USB 2.0, and + and − terminals of a signal transmission line for USB 3.0 in the case of USB 3.0) of the USB connector 51, into a modulation signal of extremely high frequency for transmission.

In addition, the communication unit 53 receives a modulation signal of extremely high frequency, frequency-converts it into a baseband signal, and supplies it to the USB host 10 via a terminal for data transmission (e.g., +D and −D terminals in the case of USB 2.0, and + and − terminals of a signal reception line for USB 3.0 in the case of USB 3.0) of the USB connector 51.

The millimeter wave cable 60 is configured to be the same as the millimeter wave cable 50.

Specifically, the millimeter wave cable 60 is a cable having one end to which the USB connector 61 to be connected to the USB device 40 is provided and the other end to which the millimeter wave cable 62 to be fitted with the millimeter wave cable 52 is provided.

In the millimeter wave cable 60, the USB connector 61 and a line between the USB connector 61 and the millimeter wave cable 62 are configured to be the same as the USB connector 32 of the USB cable 30 and a line between the USB connectors 31 and 32 shown in FIG. 1, respectively.

The millimeter wave cable 62 has a communication unit 63, which performs communication with a modulation signal of extremely high frequency.

The communication unit 63 frequency-converts a differential signal (differential signal of a baseband), which is a baseband signal supplied from the USB device 40 via a terminal for data transmission (e.g., +D and −D terminals in the case of USB 2.0, and + and − terminals of a signal reception line (viewed from the side of the USB host 10) for USB 3.0 in the case of USB 3.0) of the USB connector 61, into a modulation signal of extremely high frequency for transmission.

In addition, the communication unit 63 receives a modulation signal of extremely high frequency, frequency-converts it into a baseband signal, and supplies it to the USB device 40 via a terminal for data transmission (e.g, +D and −D terminals in the case of USB 2.0, and + and − terminals of a signal transmission line (viewed from the side of the USB host 10) for USB 3.0 in the case of USB 3.0) for USB 3.0 in the case of USB3.0) of the USB connector 61.

It should be noted that the USB device 40 and the millimeter wave cable 60 can be integrally formed with each other so that the side of the USB connector 61 of the millimeter wave cable 60 is always connected to the USB device 40.

Moreover, as the lengths of the millimeter wave cables 50 and 60, about 10 cm to 1 m can be adopted, for example.

In the communication system configured as described above in FIG. 3, if the USB connectors 11 and 51, the millimeter wave cables 52 and 62, and the USB connectors 41 and 61 are connected to each other, data can be transmitted between the USB host 10 and the USB device 40 through the millimeter wave cables 50 and 60.

Specifically, the baseband signal serving as data transmitted from the USB host 10 is frequency-converted into a modulation signal of a millimeter wave in the communication unit 53 for transmission.

The modulation signal transmitted from the communication unit 53 is received by the communication unit 63, is frequency-converted into a baseband signal, and is supplied to the USB device 40.

On the other hand, the baseband signal serving as data transmitted from the USB device 40 is frequency-converted into a modulation signal of a millimeter wave in the communication unit 63 for transmission.

The modulation signal transmitted from the communication unit 63 is received by the communication unit 53, is frequency-converted into a baseband signal, and is supplied to the USB host 10.

As described above, because the data transmission between the USB host 10 and the USB device 40 is performed with a modulation signal of a millimeter wave in the communication system shown in FIG. 3, the USB host 10 and the USB device 40 that are electronic apparatuses can be connected not only through the USB cable 30 but also through the millimeter wave cables 50 and 60, thereby making it possible to increase the variation of a connection mode between electronic apparatuses.

Here, in the communication system shown in FIG. 3, the millimeter wave cables 52 and 62 that have the communication unit 53 and 63 therein, respectively, in which transmission and reception of a modulation signal of a millimeter wave is performed, can include a dielectronic such as a plastic or other non-metal.

Therefore, according to the millimeter wave cables 52 and 62, it is possible to easily perform water control or dust control as compared to a connector including metal, to leave the degradation of a connection portion due to insertion/extraction out of consideration, and to increase the degree of freedom of design.

It should be noted that the millimeter wave cables 52 and 62 can be configured not only by non-metal but also by metal.

In addition, although the communication unit 53 is incorporated into the millimeter wave cable 52 in FIG. 3, the communication unit 53 can be incorporated into the USB connector 51, for example.

In the case where the communication unit 53 is incorporated into the USB connector 51, it needs to constitute a transmission path of a millimeter wave (e.g., form a transmission path that introduces a millimeter wave by dielectronics having a different dielectronic constant) between the USB connector 51 and the millimeter wave cable 52 of the millimeter wave cable 50.

Similarly, the communication unit 63 can be incorporated not only into the millimeter wave cable 62 but also into the USB connector 61. Also in the case where the communication unit 63 is incorporated into the USB connector 61, it needs to constitute a transmission path of a millimeter wave between the USB connector 61 and the millimeter wave cable 62 of the millimeter wave cable 60.

Here, although the millimeter wave cables 52 and 62 can include any one of metal and non-metal as described above, the merit of forming them by non-metal is larger than that of forming them by metal.

In this regard, in the case where the millimeter wave cables 52 and 62 include non-metal, it is difficult to supply a power source by bus power, which can be performed if the USB host 10 and the USB device 20 are connected to each other through the USB cable 30 as shown in FIG. 1

Therefore, in the case where the USB host 10 and the USB device 40 are connected to each other through the millimeter wave cables 50 and 60 as shown in FIG. 3, an electronic apparatus that operates by not being supplied with a power source by bus power but being supplied with a power source uniquely from an external power source or being supplied with a power source from a built-in battery is adopted as the USB device 40, for example.

Because the USB device 40 operates by being supplied with a power source uniquely from an external power source or being supplied with a power source from a built-in battery as described above, the USB device 40 is different from the USB device 20 that operates by being supplied with a power source by bus power in FIG. 1, and the state of the power source of the USB device 40 is not affected by the connection with the USB host 10, and remains on or off even if the USB device 40 is connected to the USB host 10 or is disconnected from the USB host 10.

It should be noted that in this embodiment, the power source of the USB device 40 is assumed to be on, for example.

<Configuration Example of Communication Units 53 and 63>

Figure 4:
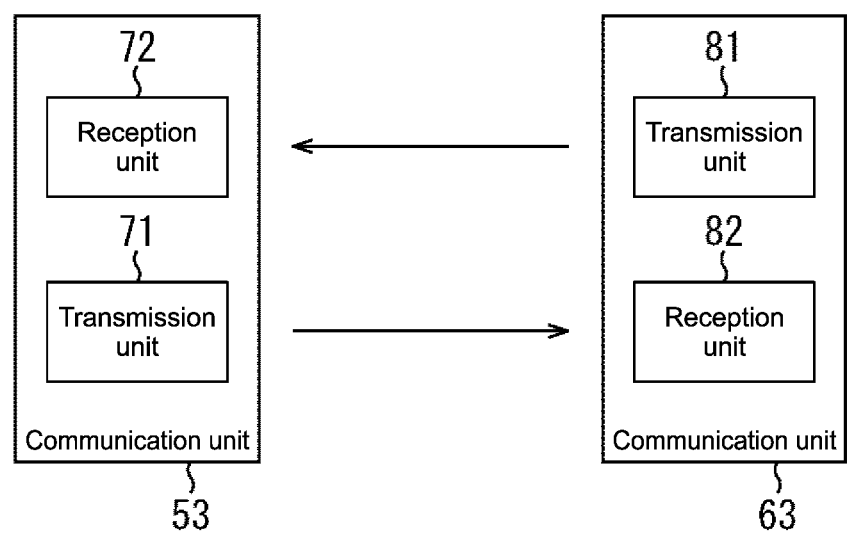
FIG. 4 A block diagram showing a configuration example of communication units 53 and 63.

FIG. 4 is a block diagram showing a configuration example of the communication units 53 and 63 shown in FIG. 3.

The communication unit 53 includes a transmission unit 71 and a reception unit 72.

The transmission unit 71 transmits a signal (data) by a carrier communication method using a signal of extremely high frequency as a carrier, for example. Specifically, the transmission unit 71 converts the baseband signal that is a signal of a baseband into a modulation signal of extremely high frequency for transmission.

The reception unit 72 receives a modulation signal of extremely high frequency that is transmitted by a carrier communication method, frequency-converts it into a baseband signal, and outputs it.

The communication unit 63 includes a transmission unit 81 and a reception unit 82.

The transmission unit 81 transmits a signal by a carrier communication method using, as a carrier, a signal of a millimeter wave of a frequency band that is the same as that of the transmission unit 71 or different from that of the transmission unit 71, for example. Specifically, the transmission unit 81 frequency-converts the baseband signal into a modulation signal of extremely high frequency for transmission.

The reception unit 82 receives a modulation signal of extremely high frequency that is transmitted by a carrier communication method, frequency-converts it into a baseband signal, and outputs it, similarly to the reception unit 72.

As described above, because the communication unit 53 includes the transmission unit 71 and the reception unit 72 and the communication unit 63 includes the transmission unit 81 and the reception unit 82, it is possible to perform bidirectional communication between the communication units 53 and 63

It should be noted that in the case where a signal of a millimeter wave of the same frequency band is used as a carrier in the transmission units 71 and 81, it is possible to perform half-duplex communication between the communication units 53 and 63. It should be noted that even in the case where a signal of a millimeter wave of the same frequency band is used as a carrier in the transmission units 71 and 81, it is possible to perform full-duplex communication by taking isolation of the transmission units 71 and 81. In addition, in the case where a signal of a millimeter wave of a different frequency band is used as a carrier in the transmission units 71 and 81, it is possible to perform full-duplex communication between the communication units 53 and 63.

Figure 5:
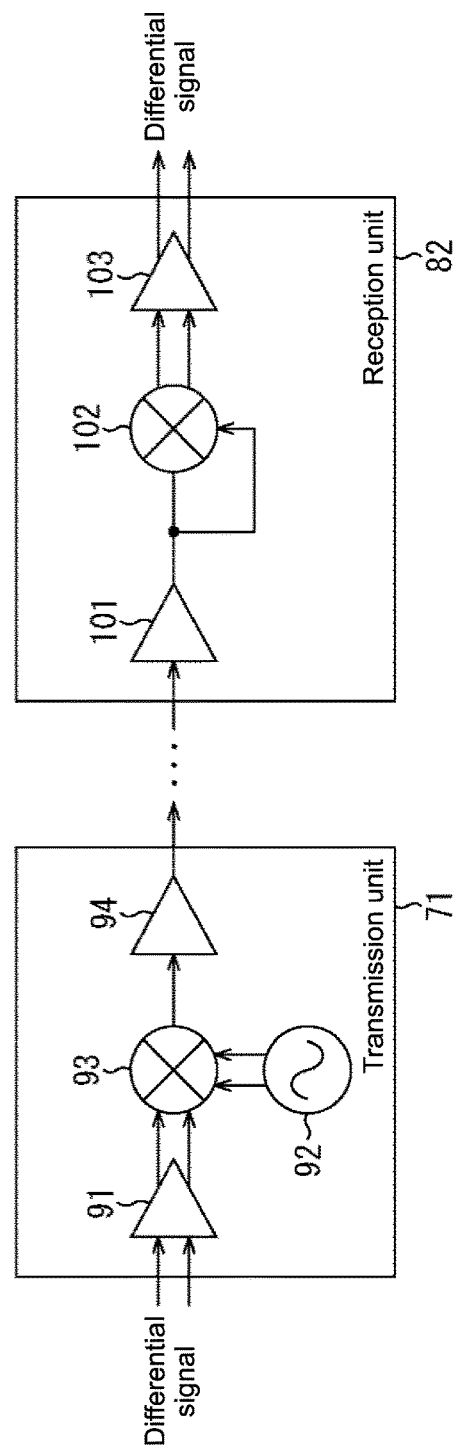
FIG. 5 A diagram showing a configuration example of a transmission unit 71 and a reception unit 82.

FIG. 5 is a diagram showing a configuration example of the transmission unit 71 and the reception unit 82 shown in FIG. 4.

It should be noted that the transmission unit 81 shown in FIG. 4 is configured to be the same as the transmission unit 71, and the reception unit 72 shown in FIG. 4 is configured to be the same as the reception unit 82.

The transmission unit 71 includes an amplifier 91, an oscillator 92, a mixer 93, and an amplifier 94.

To the amplifier 91, a differential signal (e.g, +D and −D signals in the case of USB 2.0, and + and − signals of a signal transmission line for USB 3.0 in the case of USB 3.0), which is a baseband signal, is supplied from the USB host 10.

The amplifier 91 amplifies the differential signal as necessary, and supplies it to the mixer 93.

The oscillator 92 generates a carrier of extremely high frequency such as 56 GHz by oscillation, and supplies it to the mixer 93.

Here, according to the carrier of extremely high frequency such as 56 GHz, it is possible to transmit a differential signal at a data rate of 11 Gbps at most, for example. For example, because the maximum data rate is 5 Gbps (Giga bit per second) in the case of USB 3.0, according to the carrier of extremely high frequency such as 56 GHz, it is possible to transmit data (differential signal) of USB 3.0 with no difficulty.

The mixer 93 frequency-converts the differential signal by the carrier from the oscillator 92 by mixing (multiplying) the differential signal from the amplifier 91 with the carrier from the oscillator 92, and supplies the resultant modulation signal of amplitude modulation (ASK (Amplitude Shift Keying)) of extremely high frequency to the amplifier 94, for example.

The amplifier 94 amplifies a modulation signal from the mixer 93 as necessary, and transmits it on a transmission path of a millimeter wave (not shown).

The reception unit 82 includes an amplifier 101, a mixer 102, and an amplifier 103.

The amplifier 101 receives a modulation signal of extremely high frequency transmitted from the transmission unit 71, amplifies it as necessary, and supplies it to the mixer 102.

The mixer 102 frequency-converts the modulation signal of extremely high frequency from the amplifier 101 into a differential signal being a baseband signal by performing squared detection, which mixes the modulation signal of extremely high frequency supplied from the amplifier 101 (squares the modulation signal), and supplies it to the amplifier 103.

The amplifier 103 amplifies the differential signal from the mixer 102 as necessary, and supplies it to the USB device 40 as a USB differential signal (e.g., +D and −D signals in the case of USB 2.0, and + and − signals of a transmission line for USB 3.0).

It should be noted that although the modulation signal of extremely high frequency is frequency-converted into a baseband signal by squared detection in the reception unit 82 in FIG. 5, it is possible to frequency-convert the modulation signal into a baseband signal by detection other than squared detection, such as synchronized detection that reproduces a carrier and mixes the carrier with the modulation signal, in the reception unit 82.

<Case where Problem Occurs in Data Transmission with Modulation Signal of Extremely High Frequency>

Figure 6:
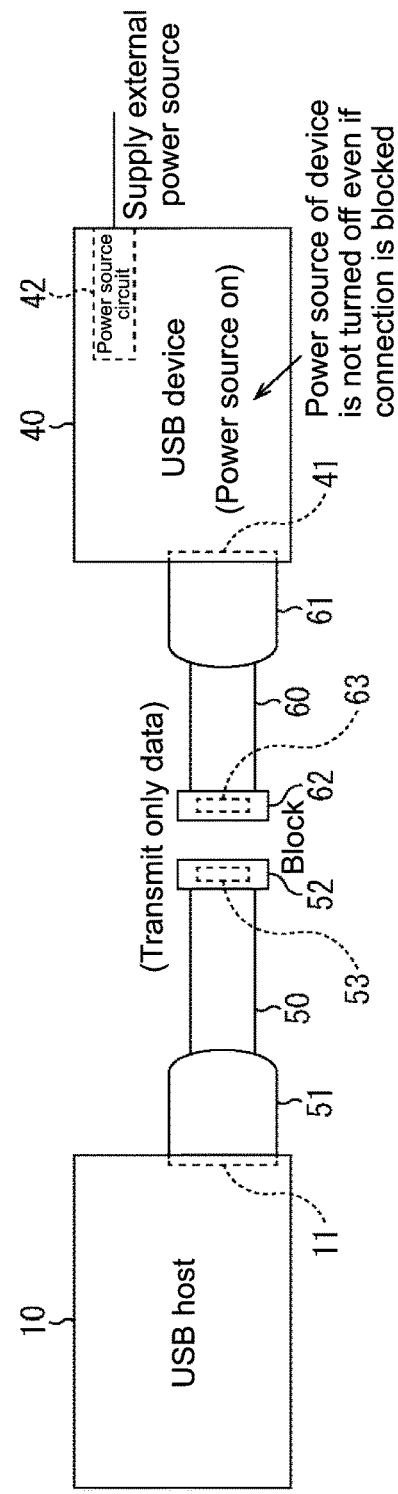
FIG. 6 A diagram for explaining an example in which a problem occurs in the data transmission with the modulation signal of extremely high frequency.

FIG. 6 is a diagram for explaining an example in which a problem occurs in the data transmission with the modulation signal of extremely high frequency.

As shown in FIG. 3, the power source of the USB device 40 is on, and the on and off of the power source is not affected by the connection with the USB host 10.

On the other hand, in the USB device, initialization processing for causing the USB device to be in the state of being capable of establishing connection is often started to communicate with (transmit data to) the USB host 10 with the turning on of the power source as a trigger, as in the USB device 20 that operates by being supplied with a power source by bus power.

Now, the USB device 40 is assumed to perform initialization processing (e.g., processing including power-on resetting) with the turning on of the power source as a trigger, similarly to the USB device 20. In this case, a problem may occur in data transmission with a modulation signal of extremely high frequency if the data transmission with a modulation signal of extremely high frequency is performed by connecting the USB host 10 and the USB device 40 through the millimeter wave cables 50 and 60, as shown in FIG. 3.

Specifically, even if the connection between the USB host 10 and the USB device 40 connected through the millimeter wave cables 50 and 60 as shown in FIG. 3 is blocked (cut) by releasing the connection between the millimeter wave cables 52 and 62 as shown in FIG. 6, the power source of the USB device 40 is not turned off and remains on.

After that, in the case where the USB host 10 and the USB device 40 are connected through the millimeter wave cables 50 and 60 by connecting the millimeter wave cables 52 and 62 again, the power source of the USB device 40 remains on and therefore, the initialization processing is not started in the USB device 40.

Because the initialization processing is processing (including processing) for causing the USB device 40 to be in the state of being capable of establishing connection with the USB host 10, the USB device 40 is not in the state of being capable of establishing connection if the initialization processing is not performed in the USB device 40.

Therefore, if the USB host 10 and the USB device 40 are connected to each other through the millimeter wave cables 50 and 60, the connection between the USB host 10 and the USB device 40 cannot be established. As a result, a problem that data transmission cannot be performed may occur.

In this regard, the present technology prevents the problem that data transmission cannot be performed from occurring while increasing the variation of a connection mode of an electronic apparatus.

<First Embodiment of Communication System to which Present Technology is Applied>

Figure 7:
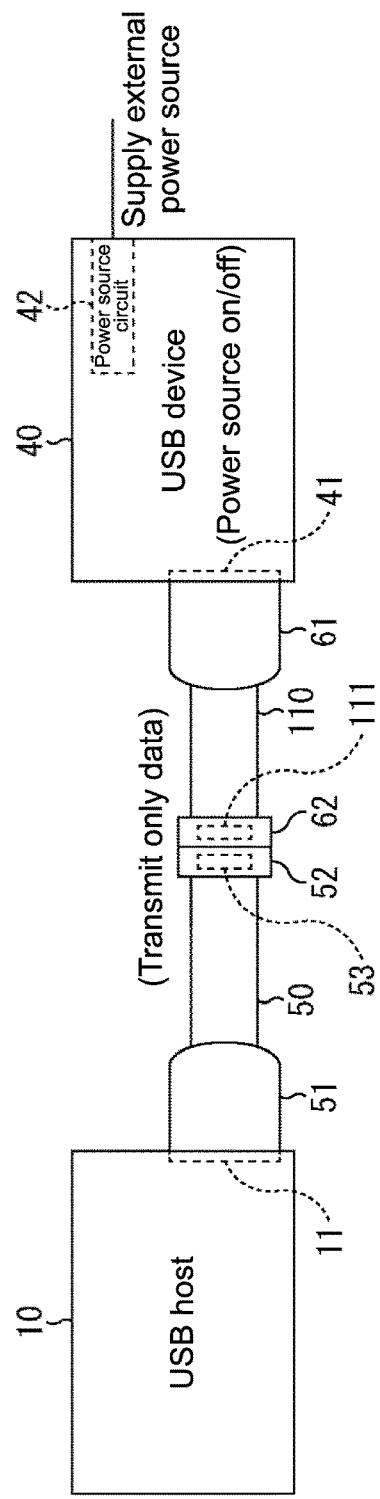
FIG. 7 A diagram showing a configuration example of a first embodiment of the communication system to which the present technology is applied.

FIG. 7 is a diagram showing a configuration example of a first embodiment of the communication system to which the present technology is applied.

It should be noted that in the figure, the same components as those in FIG. 3 will be denoted by the same reference numerals and a description thereof will be omitted appropriately.

The communication system shown in FIG. 7 is the same as that in FIG. 3 in that the communication system includes the USB host 10, the USB device 40, and the millimeter wave cable 50.

It should be noted that the communication system shown in FIG. 7 is different from that in FIG. 3 in that a millimeter wave cable 110 is provided instead of the millimeter wave cable 60.

The millimeter wave cable 110 is the same as the millimeter wave cable 60 shown in FIG. 3 in that the millimeter wave cable includes the USB connector 61 and the millimeter wave cable 62.

It should be noted that the millimeter wave cable 110 is different from the millimeter wave cable 60 shown in FIG. 3 in that the millimeter wave cable 62 has a communication unit 111 therein instead of the communication unit 63.

It should be noted that similarly to the case of FIG. 3, the USB device 40 and the millimeter wave cable 110 can be integrally formed with each other so that the side of the USB connector 61 of the millimeter wave cable 110 is always connected to the USB device 40.

Furthermore, the communication unit 111 can be incorporated not only into the millimeter wave cable 62 but also into the USB connector 61, similarly to the case of FIG. 3.

<Configuration Example of Communication Unit 111>

Figure 8:
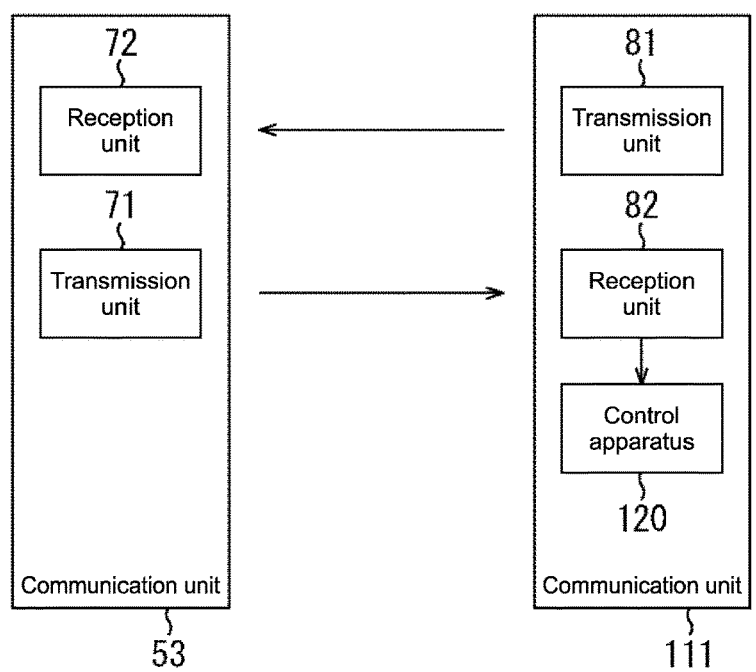
FIG. 8 A block diagram showing a configuration example of a communication unit 111.

FIG. 8 is a block diagram showing a configuration example of the communication unit 111 shown in FIG. 7.

It should be noted that in the figure, the same components as the communication unit 63 shown in FIG. 4 will be denoted by the same reference numerals and a description thereof will be omitted appropriately.

The communication unit 111 shown in FIG. 8 is the same as the communication unit 63 shown in FIG. 4 in that the communication unit includes the transmission unit 81 and the reception unit 82.

It should be noted that the communication unit 111 shown in FIG. 8 is different from the communication unit 63 shown in FIG. 4 in that a control apparatus 120 is provided.

The control apparatus 120 detects the power of the modulation signal received by the reception unit 82, and controls, based on the detection results of the power, the USB device 40 serving as an electronic apparatus that receives a differential signal being a baseband signal to start the initialization processing.

<Configuration Example of Control Apparatus 120>

Figure 9:
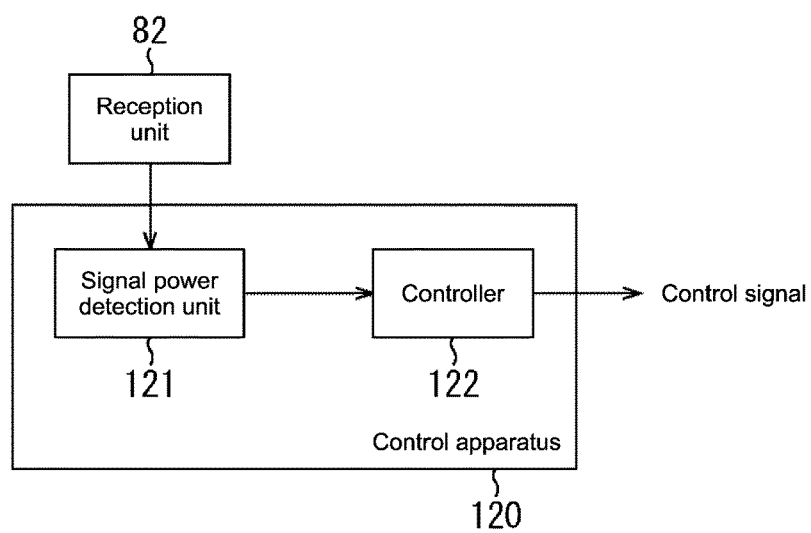
FIG. 9 A block diagram showing a configuration example of a control apparatus 120.

FIG. 9 is a block diagram showing a configuration example of the control apparatus 120 shown in FIG. 8.

The control apparatus 120 includes a signal power detection unit 121 and a controller 122.

The signal power detection unit 121 monitors the reception unit 82, detects the power of the modulation signal received by the reception unit 82, and supplies the detection results of the power to the controller 122.

The controller 122 controls the USB device 40 through the USB connectors 61 and 41 so that the initialization processing is started, based on the detection results of the power of the modulation signal from the signal power detection unit 121.

Figure 10:
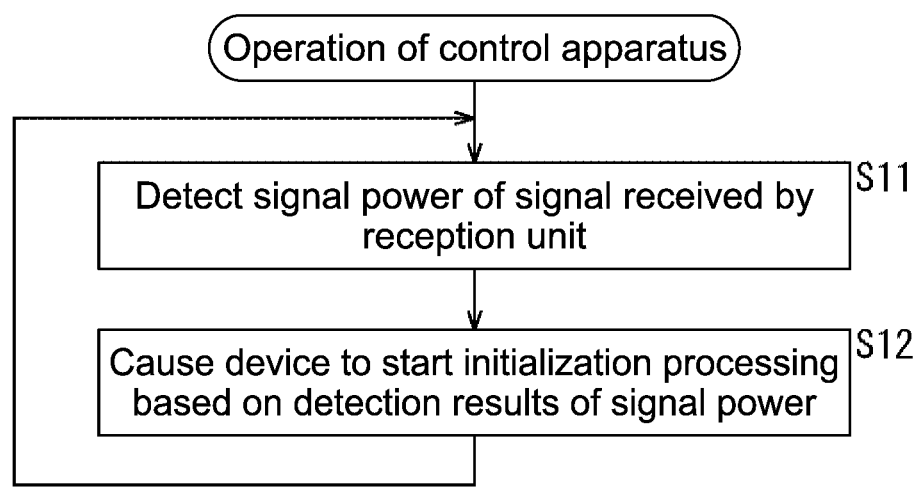
FIG. 10 A flowchart for explaining an example of the operation of the control apparatus 120.

FIG. 10 is a flowchart for explaining an example of the operation of the control apparatus 120 shown in FIG. 9.

In Step S11, the signal power detection unit 121 monitors the reception unit 82, detects the power of the modulation signal received by the reception unit 82, and supplies the detection results of the power to the controller 122, and the processing proceeds to Step S12.

In Step S12, the controller 122 controls the USB device 40 to start the initialization processing, based on the detection results of the power of the modulation signal from the signal power detection unit 121.

Specifically, in the case where the power of the modulation signal has a value not less than a predetermined threshold value and therefore, it is recognized that the USB host 10 and the USB device 40 are connected through the millimeter wave cables 50 and 110 and data is transmitted from the USB host 10 to the USB device 40, the controller 122 controls the USB device 40 to start the initialization processing.

Then, the processing returns from Step S12 to Step S11, and the processing of Step S11 and S12 is repeated.

<Configuration Example of Signal Power Detection Unit 121>

Figure 11:
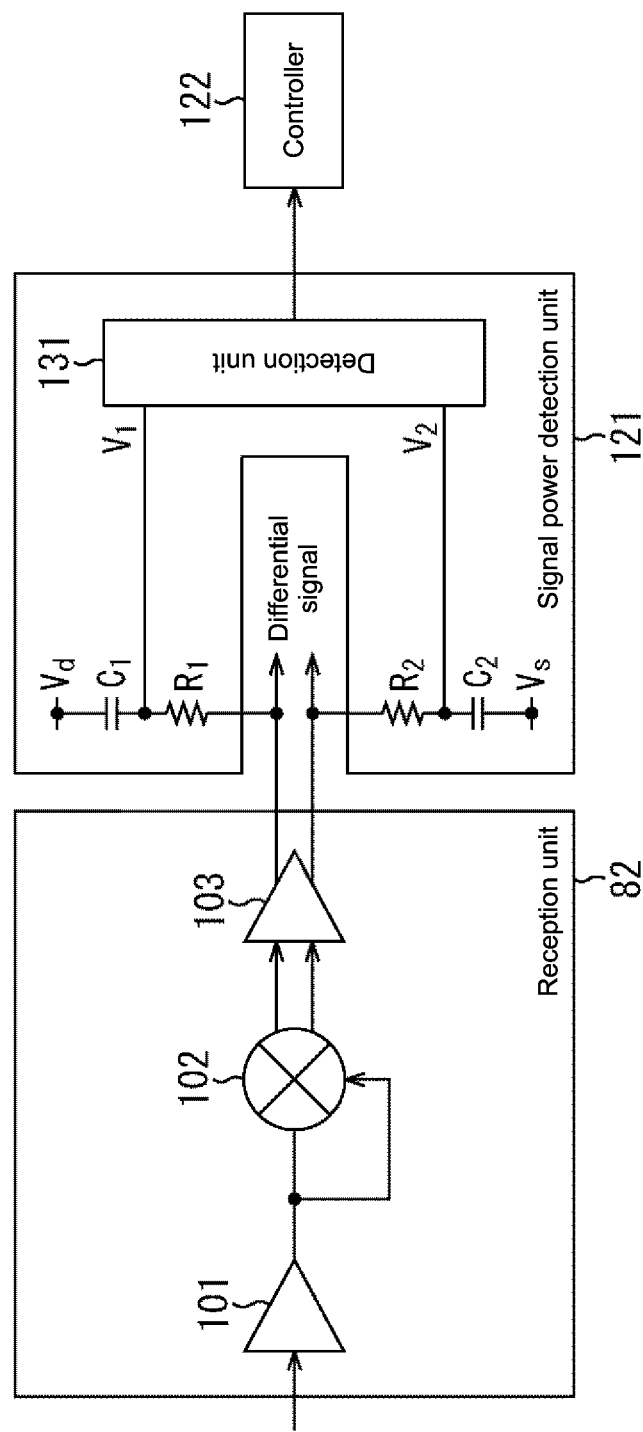
FIG. 11 A diagram showing a configuration example of a signal power detection unit 121.

FIG. 11 is a diagram showing a configuration example of the signal power detection unit 121 shown in FIG. 9.

In FIG. 11, the signal power detection unit 121 includes resistors $R_1$ and $R_2$, capacitors $C_1$ and $C_2$, and a detection unit 131.

One end of the resistor $R_1$ is connected to a terminal of two terminals that output differential signals of the amplifier 103, which outputs a non-inversion signal being one signal of the differential signals, and the other end of the resistor $R_1$ is connected to one end of the capacitor $C_1$. The other end of the capacitor $C_1$ is connected to a power source $V_d$.

One end of the resistor $R_2$ is connected to a terminal of two terminals that output differential signals of the amplifier 103, which outputs an inversion signal being the other signal of the differential signals, and the other end of the resistor $R_2$ is connected to one end of the capacitor $C_2$. The other end of the capacitor $C_2$ is connected to a power source $V_s$.

Here, the inversion signal and the non-inversion signal being differential signals are ideally signals in which the additional value of the inversion signal and the non-inversion signal is 0.

Moreover, the power source $V_d$ is a power source whose voltage is +v (>0), and the power source $V_s$ is a power source whose voltage is −v against the power source $V_d$, for example.

To the detection unit 131, a voltage $V_1$ at a connection point between the resistor $R_1$ and the capacitor $C_1$, and a voltage $V_2$ at a connection point between the resistor $R_2$ and the capacitor $C_2$ are supplied.

Here, a DC offset of the non-inversion signal out of the differential signals appears at the connection point between the resistor $R_1$ and the capacitor $C_1$, and a DC offset of the inversion signal out of the differential signals appears at the connection point between the resistor $R_2$ and the capacitor $C_2$.

Therefore, the voltage $V_1$ is the DC offset of the non-inversion signal, and the voltage $V_2$ is the DC offset of the inversion signal.

The detection unit 131 detects a difference $V_1$-$V_2$ between the voltages $V_1$ and $V_2$ as the power of the modulation signal received by the reception unit 82.

Here, in the case where the modulation signal is not received in the reception unit 82, i.e., the power of the modulation signal is 0 (or has a value that can be regarded as 0), the DC offsets of the non-inversion signal and the inversion signal are (almost) 0.

On the other hand, in the case where the millimeter wave cables 52 and 62 are connected to each other and a modulation signal is transmitted from the USB host 10 to the USB device 40, the DC offsets $V_1$ and $V_2$ of the non-inversion signal and the inversion signal each have a value corresponding to the power of the modulation signal.

In this regard, in the detection unit 131, the DC offsets (voltages) $V_1$ and $V_2$ of the non-inversion signal and the inversion signal being differential signals are detected as the power of the modulation signal received by the reception unit 82.

Here, if the DC offset $V_1$ of the non-inversion signal is +a (>0), for example, the DC offset $V_2$ of the inversion signal is ideally −a. Specifically, the DC offset $V_1$ of the non-inversion signal and the DC offset $V_2$ of the inversion signal have values whose magnitude is the same and whose sign is inverted.

Therefore, the detection unit 131 can detect only one of the DC offset $V_1$ of the non-inversion signal and the DC offset $V_2$ of the inversion signal as the power of the modulation signal received by the reception unit 82.

It should be noted that it is possible to improve the sensitivity of the detection of the power of the modulation signal by detecting the difference $V_1$-$V_2$ between the voltages $V_1$ and $V_2$ as the power of the modulation signal received by the reception unit 82 in the detection unit 131, as described above, as compared to the case where only one of the DC offsets $V_1$ and $V_2$ is detected as the power of the modulation signal.

It should be noted that although the output of the amplifier 103 of the reception unit 82 is used to detect the power of the modulation signal received by the reception unit 82 in the signal power detection unit 121 in FIG. 11, the signal power detection unit 121 can detect the power of the modulation signal received by the reception unit 82 by using the output of the mixer 102 or the output of the amplifier 101.

Figure 12:
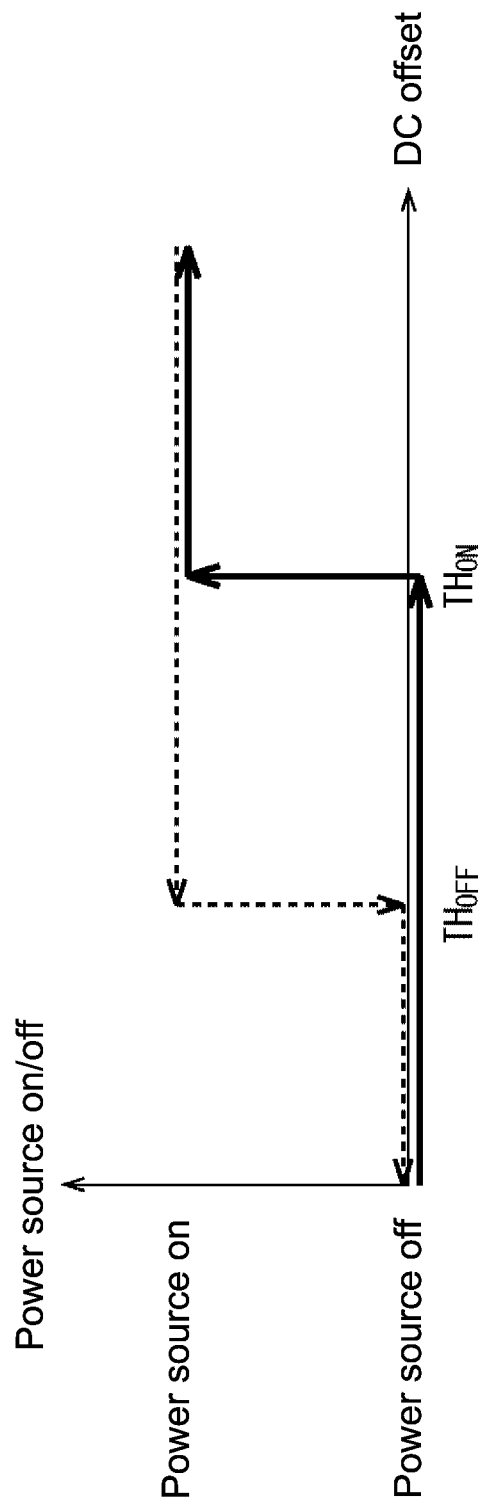
FIG. 12 A diagram for explaining an example of control of a USB device 40 by a controller 122.

FIG. 12 is a diagram for explaining an example of control of the USB device 40 by the controller 122 shown in FIG. 9.

The controller 122 controls the USB device 40 through the USB connectors 61 and 41 to start the initialization processing, based on the detection results of the power of the modulation signal from the signal power detection unit 121.

Here, as described above with reference to FIG. 6, the USB device 40 performs the initialization processing with the turning on of the power source as a trigger, similarly to the USB device 20.

In this regard, in the case where the power of the modulation signal has a value not less than a predetermined threshold value and therefore, it is recognized (determined) that the millimeter wave cables 52 and 62 are connected to each other and the modulation signal is transmitted from the USB host 10 to the USB device 40, the controller 122 controls the USB device 40 to start the initialization processing by turning on (from off) the power source of the USB device 40.

Moreover, in the case where the power source of the USB device 40 is on, the power of the modulation signal has a value not more than a predetermined threshold value and therefore, it is recognized (determined) that the connection between the millimeter wave cables 52 and 62 is released and the USB device 40 cannot receive the modulation signal from the USB host 10, the controller 122 controls the USB device 40 to turn off the power source of the USB device 40.

Then, in the case where the power source of the USB device 40 is off and the power of the modulation signal has a value not less than a predetermined threshold value, the controller 122 controls the USB device 40 to start the initialing processing by turning on the power source of the USB device 40, as described above.

Here, in the controller 122, a first threshold value when the power source of the USB device 40 is turned on is referred to as an on-threshold value $TH_{ON}$, and a second threshold value when the power source of the USB device 40 is turned off is referred to as an off-threshold value $TH_{OFF}$.

Now, if the same predetermined threshold value is adopted as the on-threshold value $TH_{ON}$ and the off-threshold value $TH_{OFF}$, turning on and off of the power source of the USB device 40 may be frequently switched in the case where the power of the modulation signal has a value close to the predetermined threshold value.

In this regard, as shown in FIG. 12, different values having the relationship of an equation $TH_{ON}>TH_{OFF}$ may be adopted as the on-threshold value $TH_{ON}$ and the off-threshold value $TH_{OFF}$ to make it possible to cause the control of the power source of the USB device 40 by the controller 122 to have a so-called hysteresis.

In this case, if the power of the modulation signal has a value not less than the on-threshold value $TH_{ON}$, the power source of the USB device 40 is turned on. However, in the case where the power source of the USB device 40 is on, the power source of the USB device 40 is not turned off even if the power of the modulation signal has a value not more than the on-threshold value $TH_{ON}$.

In the case where the power source of the USB device 40 is on, the power source of the USB device 40 is turned off when the power of the modulation signal has a value not more than the off-threshold value $TH_{OFF}$ smaller than the on-threshold value $TH_{ON}$.

Then, in the case where the power source of the USB device 40 is off, the power source of the USB device 40 is not turned on even if the power of the modulation signal has a value not less than the off-threshold value $TH_{OFF}$.

In the case where the power source of the USB device 40 is off, the power source of the USB device 40 is turned on when the power of the modulation signal has a value not less than the on-threshold value $TH_{ON}$ larger than the off-threshold value $TH_{OFF}$.

As described above, it is possible to prevent the turning on and off of the power source of the USB device 40 from being switched frequently, by causing the control of the power source of the USB device 40 by the controller 122 to have a hysteresis.

Figure 13:
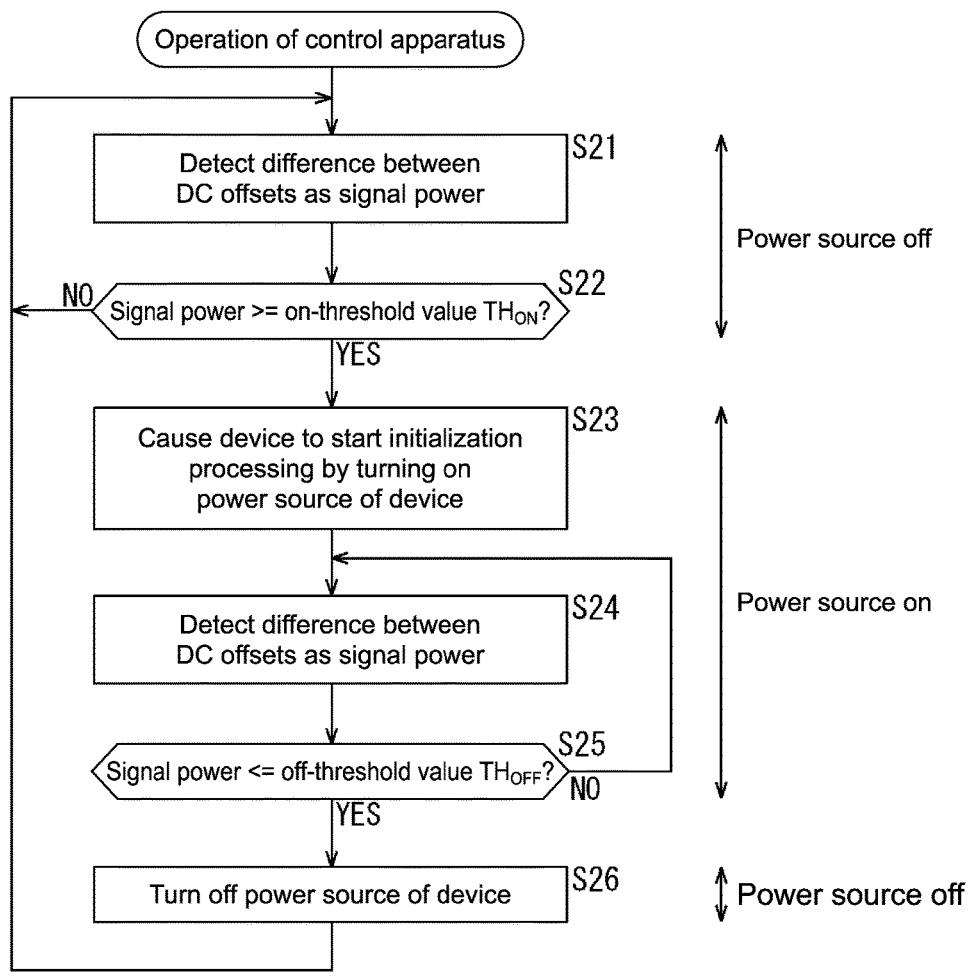
FIG. 13 A flowchart for explaining an example of the operation of the control apparatus 120.

FIG. 13 is a flowchart for explaining an example of the operation of the control apparatus 120 in the case where the signal power detection unit 121 is configured as shown in FIG. 11.

It should be noted that the power source of the USB device 40 is assumed to be off before the operation in accordance with the flowchart in FIG. 13 is started.

In Step S21, the signal power detection unit 121 detects, as the power of the modulation signal received by the reception unit 82, the difference $V_1-V_2$ between the DC offset $V_1$ of the non-inversion signal and the DC offset $V_2$ of the inversion signal of the differential signals serving as the baseband signal obtained by frequency-converting the modulation signal of extremely high frequency output from the reception unit 82, and supplies it to the controller 122, and the processing proceeds to Step S22.

In Step S22, the controller 122 determines whether or not the power of the modulation signal from the signal power detection unit 121 (hereinafter, referred to also as signal power) is not less than the on-threshold value $TH_{ON}$.

In the case where it is determined that the signal power is not equal to or more than the on-threshold value $TH_{ON}$ in Step S22, i.e., the millimeter wave cables 52 and 62 are not connected to each other and a modulation signal is not transmitted from the USB host 10 to the USB device 40, the processing returns to Step S21 and the same processing is repeated.

Moreover, in the case where it is determined that the signal power is not less than the on-threshold value $TH_{ON}$ in Step S22, i.e., the millimeter wave cables 52 and 62 are connected to each other and a modulation signal is transmitted from the USB host 10 to the USB device 40, the processing proceeds to Step S23 and the controller 122 controls the USB device 40 to turn on the power source of the USB device 40.

In the USB device 40, the power source is turned on in accordance with the control by the controller 122, and the initialization processing is performed with the turning on of the power source as a trigger. With the initialization processing, the USB device 40 is in the state of being capable of establishing (USB) connection and establishes connection with the USB host 10, making it possible to transmit data.

After that, the processing proceeds from Step S23 to Step S24. The signal power detection unit 121 detects, as the power of the modulation signal received by the reception unit 82, the difference $V_1-V_2$ between the DC offset $V_1$ of the non-inversion signal and the DC offset $V_2$ of the inversion signal of the differential signals, and supplies it to the controller 122, similarly to Step S21, and the processing proceeds to Step S25.

In Step S25, the controller 122 determines whether or not the power (signal power) of the modulation signal from the signal power detection unit 121 is not more than the on-threshold value $TH_{OFF}$.

In the case where it is determined that the signal power is not equal to or less than the on-threshold value $TH_{OFF}$ in Step S25, i.e., the connection between the millimeter wave cables 52 and 62 is not released and the USB device 40 can receive the modulation signal from the USB host 10, for example, the processing returns to Step S24 and the same processing is repeated.

Moreover, it is determined that the signal power is not more than the off-threshold value $TH_{OFF}$ in Step S25, i.e., the connection between the millimeter wave cables 52 and 62 is released and the USB device 40 cannot receive the modulation signal from the USB host 10, for example, the processing proceeds to Step S26 and the controller 122 controls the USB device 40 to turn off the power source of the USB device 40.

The power source of the USB device 40 is turned off in accordance with the control by the controller 122. Then, the processing returns from Step S26 to Step S21, and the same processing is repeated.

As described above, because the control apparatus 120 controls the USB device 40 to start the initialization processing for causing it to be in the state of being capable of establishing connection based on the detection results of the power of the modulation signal of extremely high frequency, it is possible to prevent that the data transmission using the modulation signal of extremely high frequency cannot be performed due to that the initialization processing is not performed in the USB device 40 and thus the USB device 40 is not in the state of being capable of establishing connection.

Moreover, the control apparatus 120 can control the USB device 40 to turn on or off the power source based on the detection results of the power of the modulation signal of extremely high frequency.

As described above, in the case where the USB device 40 performs the initialization processing using the turning on of the power source as a trigger, it is possible to cause the USB device 40 to start the initialization processing by controlling the turning on and off of the power source of the USB device 40 based on the detection results of the power of the modulation signal of extremely high frequency.

Moreover, in the case where the USB device 40 is controlled to turn on or off the power source based on the detection results of the power of the modulation signal of extremely high frequency, it is possible to turn on/off the power source of the USB device 40 by the user connecting the millimeter wave cables 52 and 62 to each other or releasing the connection between them.

Therefore, in the case where the USB device 40 is controlled to turn on or off the power source based on the detection results of the power of the modulation signal of extremely high frequency, it is possible to cause the USB device 40 to be recovered from the hang-up state to the normal state by the power-on reset processing, i.e., the user releases the connection between the millimeter wave cables 52 and 62 when the USB device 40 is hung up, for example, and connects the millimeter wave cable 52 and 62 again, thereby temporarily turning off the power source of the USB device 40 before the power source is turned on.

Moreover, because the power source of the USB device 40 can be turned off by the user releasing the connection between the millimeter wave cables 52 and 62, it is possible to reduce the electronic power consumption of the USB device 40 in the case where the millimeter wave cables 52 and 62 are not connected to each other, i.e., the USB host 10 and the USB device 40 are not connected to each other.

Here, in (the controller 122 of) the control apparatus 120, the control of turning of and off of the USB device 40 can be performed via a signal line through which +D and −D signals for data transmission of USB 2.0 are exchanged in the case where the USB device 40 conforms to USB 3.0, for example.

<Second Embodiment of Communication System to which Present Disclosure is Applied>

Figure 14:
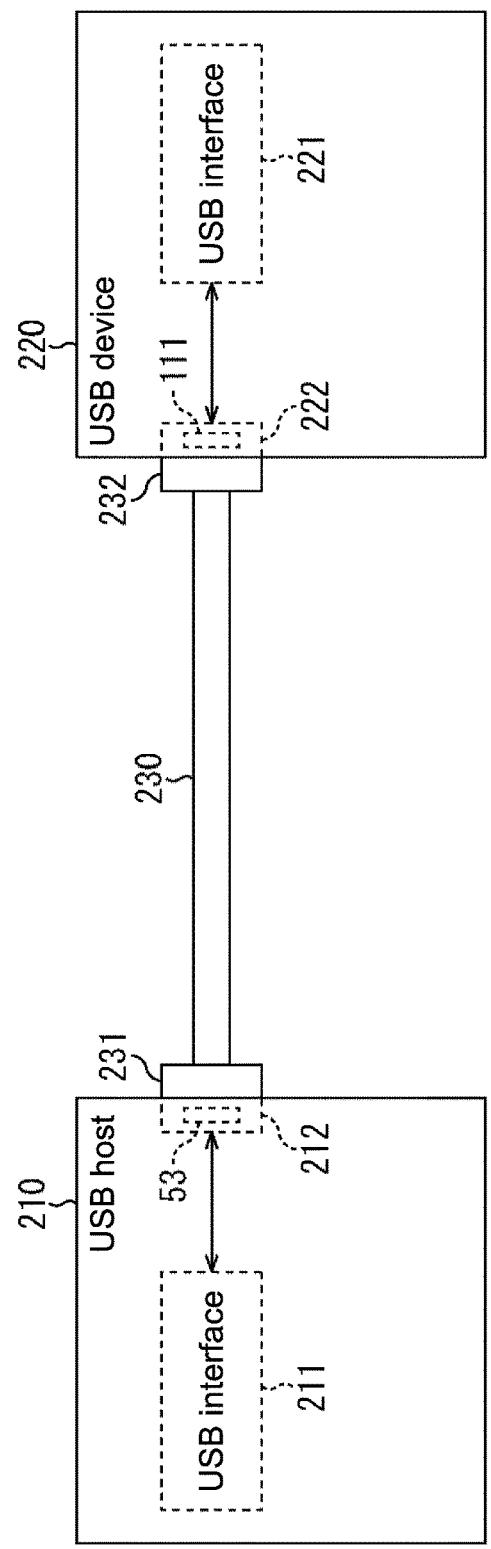
FIG. 14 A diagram showing a configuration example of a second embodiment of the communication system to which the present technology is applied.

FIG. 14 is a diagram showing a configuration example of a second embodiment of the communication system to which the present technology is applied.

It should be noted that in the figure, the same components as those in FIG. 7 will be denoted by the same reference numerals and a description thereof will be omitted appropriately.

In the communication system shown in FIG. 14, a USB host 210 and a USB device 220 are connected to each other through a millimeter wave transmission cable 230.

The USB host 210 is an electronic apparatus having the same function of serving as a USB host as the USB host 10, and includes a USB interface 211 and a millimeter wave connector 212.

The USB interface 211 is an interface controlling the data transmission by USB and is connected to the millimeter wave connector 212.

The millimeter wave connector 212 has the communication unit 53 therein, and is configured similarly to the millimeter wave cable 52 (FIG. 3) (FIG. 7).

The USB device 220 is an electronic apparatus having the same function of serving as a USB device as the USB device 40, and includes a USB interface 221 and a millimeter wave connector 222.

The USB interface 221 is an interface controlling the data transmission by USB, and is connected to the millimeter wave connector 222.

The millimeter wave connector 222 has the communication unit 111 therein, and is configured similarly to the millimeter wave cable 62 (FIG. 7).

It should be noted that although the USB device 220 includes the same power source circuit as the power source circuit 42 of the USB device 40, illustration of the power source circuit is omitted.

The millimeter wave transmission cable 230 is a cable that serves as a transmission path of a millimeter wave and has one end to which a millimeter wave connector 231 that is to be fitted with the millimeter wave connector 212 of the USB host 210 is provided and the other end to which a millimeter wave connector 232 that is to be fitted with the millimeter wave connector 222 of the USB device 220 is provided.

In FIG. 14, the millimeter wave connector 231 of the millimeter wave transmission cable 230 is connected to the millimeter wave connector 212 of the USB host 210 and the millimeter wave connector 232 of the millimeter wave transmission cable 230 is connected to the millimeter wave connector 222 of the USB device 220, thereby connecting the USB host 210 and the USB device 220 to each other through the millimeter wave transmission cable 230.

Then, the modulation signal of extremely high frequency is exchanged between the communication units 212 and 222 through the millimeter wave transmission cable 230, thereby performing data transmission between the USB interface 211 of the USB host 210 and the USB interface 221 of the USB device 220.

In FIG. 14, the millimeter wave connectors 212, 222, 231, and 232 can include non-metal similarly to the millimeter wave cables 52 and 62 (FIG. 3) (FIG. 7). In this case, it is possible to easily perform water control or dust control as compared to a connector including metal, to leave the degradation of a connection portion due to insertion/extraction out of consideration, and to increase the degree of freedom of design.

Here, in the communication system shown in FIG. 7, it needs to connect the USB host 10 and the USB device 40 to each other through the two millimeter wave cables 50 and 60 to perform data transmission between the USB host 10 and the USB device 40.

It should be noted that in the communication system shown in FIG. 7, it does not need to provide a millimeter wave connector such as the millimeter wave connectors 212 and 222 to the USB host 10 or the USB device 40 unlike the case of FIG. 14.

On the other hand, in the communication system shown in FIG. 14, it needs to provide the millimeter wave connector 212 to the USB host 210, and the millimeter wave connector 222 to the USB device 220.

It should be noted that in the communication system shown in FIG. 14, it is possible to connect the USB host 210 and the USB device 220 to each other through one millimeter wave transmission cable 230 to perform data transmission between the USB host 210 and the USB device 220.

Furthermore, in the communication system shown in FIG. 14, it is possible to enjoy merits of easily performing water control or dust control at both portions of the connection portion between the USB host 210 and the millimeter wave transmission cable 230 and the connection portion between the USB device 220 and the millimeter wave transmission cable 230.

<Third Embodiment of Communication System to which Present Disclosure is Applied>

Figure 15:
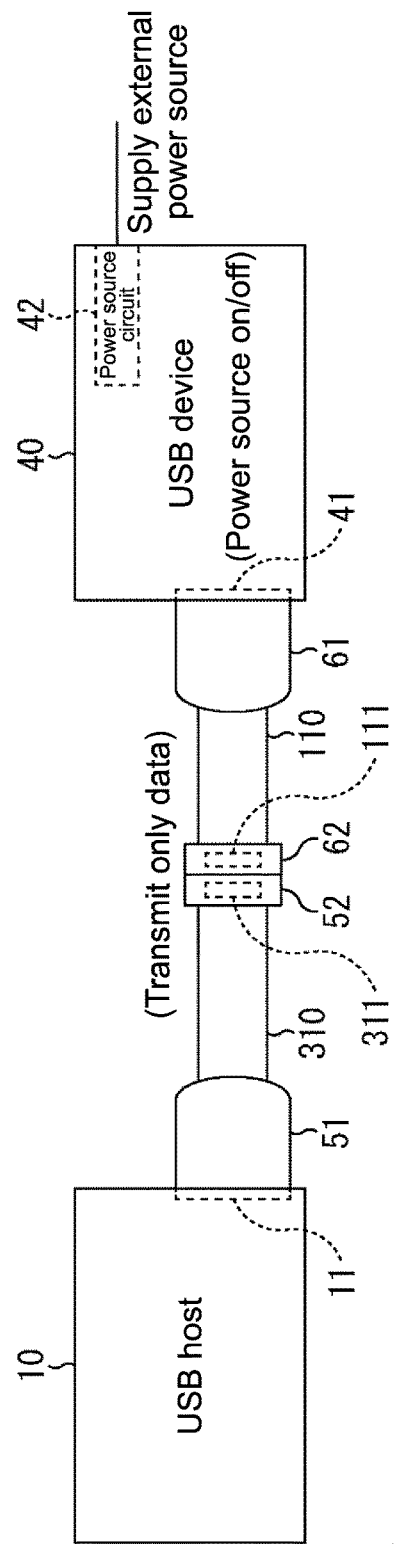
FIG. 15 A diagram showing a configuration example of a third embodiment of the communication system to which the present technology is applied.

FIG. 15 is a diagram showing a configuration example of a third embodiment of the communication system to which the present technology is applied.

It should be noted that in the figure, the same components as those in FIG. 7 will be denoted by the same reference numerals and a description thereof will be omitted appropriately.

The communication system shown in FIG. 15 is the same as that in FIG. 7 in that the communication system includes the USB host 10, the USB device 40, and the millimeter wave cable 110.

It should be noted that the communication system shown in FIG. 15 is different from that in FIG. 7 in that a millimeter wave cable 310 is provided instead of the millimeter wave cable 50.

The millimeter wave cable 310 is the same as the millimeter wave cable 50 shown in FIG. 7 in that the millimeter wave cable includes the USB connector 51 and the millimeter wave cable 52.

It should be noted that the millimeter wave cable 310 is different from the millimeter wave cable 50 shown in FIG. 7 in that the millimeter wave cable 52 has a communication unit 311 therein instead of the communication unit 53.

It should be noted that similarly to the case of the communication unit 53 shown in FIG. 3, it is possible to form a transmission path of a millimeter wave between the USB connector 51 and the millimeter wave cable 52 of the millimeter wave cable 310, and to cause the communication unit 311 to be incorporated not only into the millimeter wave cable 52 but also into the USB connector 51.

<Configuration Example of Communication Unit 311>

Figure 16:
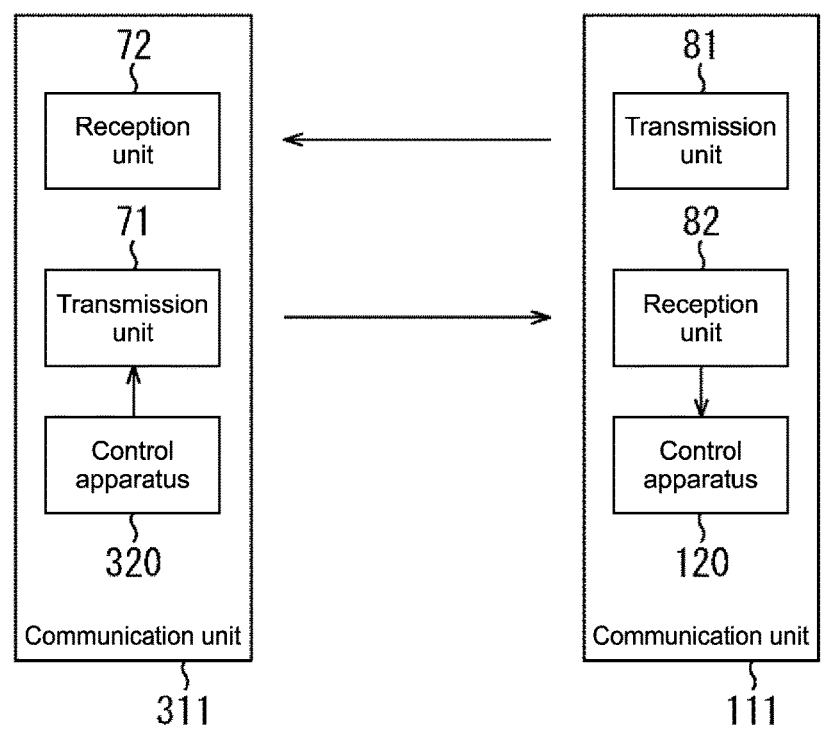
FIG. 16 A block diagram showing a configuration example of a communication unit 311.

FIG. 16 is a block diagram showing a configuration example of the communication unit 311 shown in FIG. 15.

It should be noted that in the figure, the same components as the communication unit 53 shown in FIG. 8 will be denoted by the same reference numerals and a description thereof will be omitted appropriately.

The communication unit 311 shown in FIG. 16 is the same as the communication unit 53 shown in FIG. 8 in that the communication unit includes the transmission unit 71 and the reception unit 72.

It should be noted that the communication unit 311 shown in FIG. 16 is different from the communication unit 53 shown in FIG. 8 in that a control apparatus 320 is newly provided.

The control apparatus 320 controls the turning on and off of the transmission of the modulation signal by the transmission unit 71.

<Configuration Example of Control Apparatus 320>

Figure 17:
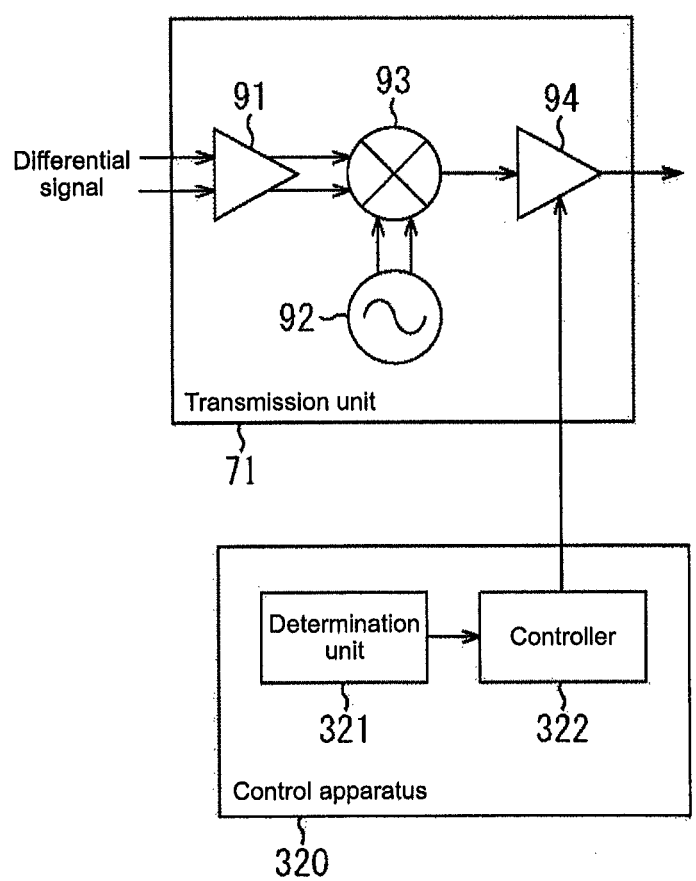
FIG. 17 A block diagram showing a configuration example of a control apparatus 320.

FIG. 17 is a block diagram showing a configuration example of the control apparatus 320 shown in FIG. 16.

The control apparatus 320 includes a determination unit 321 and a controller 322.

The determination unit 321 determines whether or not a predetermined event (hereinafter, referred to also as on/off event) of turning on/off transmission of the modulation signal occurs, and supplies the determination results to the controller 322.

By controlling, for example, the amplifier 94 of a transmission unit 71 with the on/off event as a trigger based on the determination results from the determination unit 321, the controller 322 turns on or off the transmission of the modulation signal by the amplifier 94.

Figure 18:
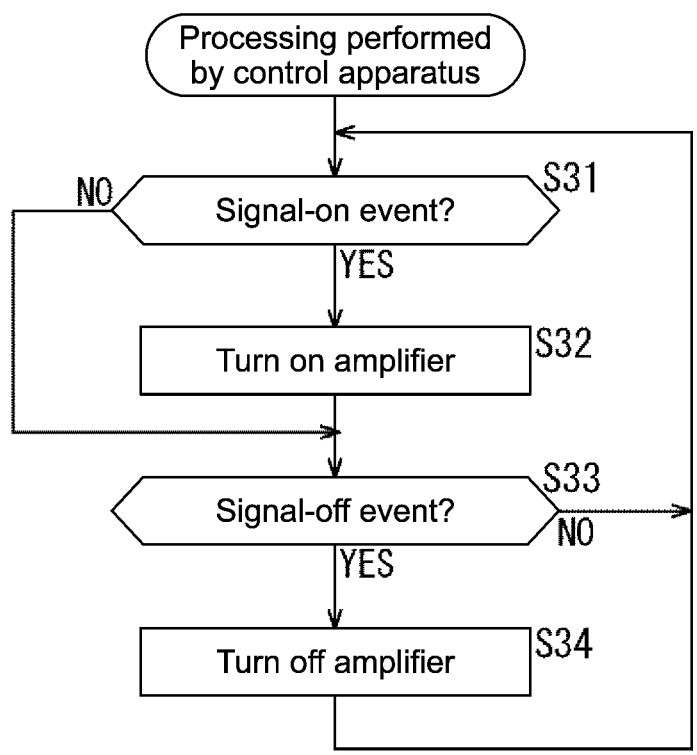
FIG. 18 A flowchart for explaining an example of the operation of the control apparatus 320.

FIG. 18 is a flowchart for explaining an example of the operation of the control apparatus 320 shown in FIG. 17.

In Step S31, the determination unit 321 determines whether or not the on event that is the predetermined event of turning on the transmission of the modulation signal occurs.

In the case where it is determined that the on event occurs in Step S31, the processing proceeds to Step S32, and the controller 322 turns on the transmission of the modulation signal by the amplifier 94 by controlling the amplifier 94. Then, the processing proceeds to Step S33.

On the other hand, in the case where it is determined that the on event does not occur in Step S31, the processing skips Step S32 and proceeds to Step S33.

In Step S33, the determination unit 321 determines whether or not the off event that is the predetermined event of turning off the transmission of the modulation signal occurs.

In the case where it is determined that the off event occurs in Step S33, the processing proceeds to Step S34, and the controller 322 controls the amplifier 94 to turn off the transmission of the amplifier signal by the amplifier 94. Then, the processing returns to Step S31.

On the other hand, in the case where it is determined that the off event does not occur in Step S33, the processing skips Step S34 and returns to Step S31. Thereafter, the same processing is repeated.

As described above, in the communication unit 311 (FIG. 16), the transmission of the modulation signal is turned on/off with the on/off event as a trigger. Therefore, from the side of the communication unit 311, furthermore, from the USB host 10, it is possible to turn on/off the power source of the USB device 40 and to control the execution of the initialization processing.

Specifically, in the communication unit 111 (FIG. 8) (FIG. 16) on the side of the USB device 40, which receives the modulation signal from the communication unit 311 on the side of the USB host 10, the power source of the USB device 40 is turned on and the initialization processing is started in the case where the signal power of the modulation signal has a value not less than the on-threshold value $TH_{ON}$, and the power source of the USB device 40 is turned off in the case where the signal power of the modulation signal has a value not more than the threshold value $TH_{OFF}$, as described above with reference to FIG. 13.

Therefore, by turning on/off the transmission of the modulation signal in such a communication unit 311 on the side of the USB host 10, which transmits the modulation signal to the communication unit 111, it is possible to turn on/off the power source of the USB device 40 and to control the execution of the initialization processing from the side of the USB host 10 without inserting/extracting the millimeter wave cable 110 or 310.

It should be noted that as the off trigger, it is possible to adopt that the modulation signal is not transmitted from (the transmission unit 81 (FIG. 16) of) the communication unit 111 on the side of the USB device 40 for a predetermined period of time or more, i.e., (the reception unit 72 of) the communication unit 311 on the side of the USB host 10 cannot receive the modulation signal from the communication unit 111 on the side of the USB device 40 for a predetermined period of time or more, for example.

In this case, it is possible to reduce the electronic power consumption due to that the transmission of the modulation signal by the communication unit 311 on the side of the USB host 10 is turned off when the USB host 10 and the USB device 40 are not connected to each other, and thus, the modulation signal is continued to be transmitted from the communication unit 311.

Moreover, in the case where the transmission of the modulation signal by the communication unit 311 is turned off using, as the off trigger, that the modulation signal is not transmitted from the communication unit 111 on the side of the USB device 40 for a predetermined period of time or more in the communication unit 311 on the side of the USB host 10, it is possible to check whether or not the off trigger in which the modulation signal is not transmitted from the communication unit 111 on the side of the USB device 40 for a predetermined period or more occurs by turning off the transmission of the modulation signal before turning on the transmission of the modulation signal again.

In the case where the transmission of the modulation signal is turned off in the communication unit 311 on the side of the USB host 10 before it is turned off, in the communication unit 111 on the side of the USB device 40, the signal power of the modulation signal received by the communication unit 111 has a value not more than the off-threshold value $TH_{OFF}$, the power source of the USB device 40 is turned off, and then, the signal power of the modulation signal has a value not less than the on-threshold value $TH_{ON}$, thereby turning on the power source of the USB device 40.

Specifically, the power source of the USB device 40 is turned off, and then is turned on.

As a result, in the USB device 40, the sequence of the initialization such as the power-on resetting is executed.

Therefore, it is possible to cause the USB device 40 to execute the sequence of initialization even in the case where the USB device 40 is in the hang-up state for any cause and thus the modulation signal is not transmitted from the communication unit 111 on the side of the USB device 40 to the communication unit 311 on the side of the USB host 10 for a predetermined period of time or more. Accordingly, it is possible to return (recover) the USB device 40 from the hang-up state to the normal state.

Moreover, as the on trigger and off trigger, the use's operation on the USB host 10 can be adopted.

In the case where the user's operation is adopted as the on trigger and the off trigger, it is possible to control the turning on/off of the power source of the USB device 40 by the user operating the USB host 10.

Furthermore, as the on trigger, that there is data to be transmitted from the USB host 10 to the USB device 40 or that there is data to be received by the USB host 10 from the USB device 40 can be adopted, for example.

Moreover, as the off trigger, that there is no data to be transmitted from the USB host 10 to the USB device 40 and there is no data to be received by the USB host 10 from the USB device 40 can be adopted, for example.

In this case, it is possible to reduce the electronic power consumption due to that the modulation signal is continued to be transmitted from the communication unit 311 when there is no data to be transmitted from/to the USB host 10.

In addition thereto, as the on trigger and the off trigger, an instruction from the application executed in the USB host 10 can be adopted, for example.

It should be noted that embodiments of the present technology are not limited to the above-mentioned embodiments and various modifications can be made without departing from the gist of the present technology.

For example, although the signal of extremely high frequency is adopted as the modulation signal in this embodiment, it is possible to adopt a signal of a frequency band lower or higher than the millimeter wave as the modulation signal.

In addition, although a case where the present technology is applied to (the communication system including) the electronic apparatus to which a USB cable can be connected has been described in this embodiment, the present technology can be applied to an electronic apparatus to which not only the USB cable but also a bus power cable that can supply a power source by bus power such as eSATAp (external Serial Advanced Technology Attachment power) can be connected, or to another arbitrary electronic apparatus.

Furthermore, although the millimeter wave cable 62 or the USB connector 61 has the communication unit 111 therein in FIG. 7, the communication unit 111 can be incorporated into an arbitrary position of the millimeter wave cable 110. The same shall apply to the communication unit 53.

In addition, although the USB device 40 is assumed to start the initialization processing with the turning on of the power source in this embodiment, (the controller 122 of) the control apparatus 120 is capable of controlling the USB device 40 to start the initialization processing instead of controlling the on and off of the power source of the USB device 40 based on the power of the modulation signal in the case where the USB device 40 can be caused to start the initialization processing via the USB connector 41 (FIG. 7) from the outside.

In this case, it does not need to turn on the power source of the USB device 40 (it should be noted that the case where the power source of the USB device 40 is off is excluded) in Step S23 of the flowchart in FIG. 13, and it does not need to turn off the power source of the USB device 40 in Step S26.

Furthermore, although the control apparatus 120 is incorporated into (the millimeter wave cable 62) of the millimeter wave cable 60 in FIG. 7, the control apparatus 120 can be incorporated into the USB device 40.

In addition, out of the signal power detection unit 121 and the controller 122 constituting the control apparatus 120, the signal power detection unit 121 can be incorporated into the millimeter wave cable 60 and the controller 122 can be incorporated into the USB device 40.

Here, in this specification, the system represents the aggregate of a plurality of components (apparatus, module, (part) etc.), and it does not matter whether or not all of the components are in the same casing. Therefore, a plurality of apparatuses that are housed in separated casings and are connected to each other through a network, and one apparatus in which a plurality of modules are housed in one casing are each a system.

Effects described in the specification are given for illustrative purposes only and not necessarily limited, and may be any other effects.

It should be noted that the present technology may also take the following configurations.

(1) A control apparatus, including
a controller configured to control an electronic apparatus receiving a baseband signal of a baseband to start initialization processing for causing the electronic apparatus to be in a state of being capable of establishing connection or to turn on or off a power source based on detection results of power of a modulation signal obtained by frequency-converting the baseband signal into a signal of a predetermined frequency band higher than the baseband.

(2) The control apparatus according to (1) above, further including
a power detection unit configured to detect the power of the modulation signal.

(3) The control apparatus according to (2) above, further including
a reception unit configured
to receive the modulation signal, and
to frequency-convert it into the baseband signal, the power detection unit using the baseband signal obtained by frequency-converting the modulation signal to detect the power of the modulation signal.

(4) The control apparatus according to (3), in which
the power detection unit detects a DC (Direct Current) offset of the baseband signal as the power of the modulation signal.

(5) The control apparatus according to (3) above, in which
the reception unit outputs a differential signal being the baseband signal, and
the power detection unit detects a difference between DC (Direct Current) offsets of differential signals as the power of the modulation signal.

(6) The control apparatus according to any one of (1) to (5) above, in which
the electronic apparatus is an electronic apparatus starting the initialization processing in response to turning on of the power source, and
the controller controls the electronic apparatus to start the initialization processing by turning on the power source of the electronic apparatus.

(7) The control apparatus according to (6) above, in which
the controller turns on the power source of the electronic apparatus in a case where the power of the modulation signal has a value not less than a first threshold value, and turns off the power source of the electronic apparatus in a case where the power of the modulation signal has a value not more than a second threshold value that is less than the first threshold value.

(8) The control apparatus according to any one of 1) to (7) above, in which
the modulation signal is a signal of extremely high frequency.

(9) The control apparatus according to any one of (1) to (8) above, in which
the electronic apparatus is an electronic apparatus to which a cable capable of supplying a power source by bus power can be connected.

(10) A control method, including
controlling an electronic apparatus receiving a baseband signal of a baseband to start initialization processing for causing the electronic apparatus to be in a state of being capable of establishing connection or to turn on or off a power source based on detection results of power of a modulation signal obtained by frequency-converting the baseband signal into a signal of a predetermined frequency band higher than the baseband.

(11) A cable connected to an electronic apparatus to which a bus power cable capable of supplying a power source by bus power can be connected, the cable including:
 a reception unit configured
  to receive a modulation signal obtained by frequency-converting a baseband signal of a baseband into a signal of a predetermined frequency band higher than the baseband, and
  to frequency-convert it into the baseband signal;
 a power detection unit configured to detect power of the modulation signal received by the reception unit; and
 a controller configured to control the electronic apparatus receiving the baseband signal to start initialization processing for causing the electronic apparatus to be in a state of being capable of establishing connection or to turn on or off a power source based on detection results of the power of the modulation signal in the power detection unit.

(12) An electronic apparatus to which a bus power cable capable of supplying a power source by bus power can be connected, the electronic apparatus including:
 a reception unit configured
  to receive a modulation signal obtained by frequency-converting a baseband signal of a baseband into a signal of a predetermined frequency band higher than the baseband, and
  to frequency-convert it into the baseband signal;
 a power detection unit configured to detect power of the modulation signal received by the reception unit; and
 a controller configured to control the electronic apparatus receiving the baseband signal to start initialization processing for causing the electronic apparatus to be in a state of being capable of establishing connection or to turn on or off a power source based on detection results of the power of the modulation signal in the power detection unit.

(13) A communication apparatus, including:
 a transmission unit configured to transmit a modulation signal obtained by frequency-converting a baseband signal of a baseband into a signal of a predetermined frequency band higher than the baseband to an apparatus configured
  to receive the modulation signal,
  to detect power of the modulation signal, and
  to control an electronic apparatus receiving the baseband signal to start initialization processing for causing the electronic apparatus to be in a state of being capable of establishing connection or to turn on or off a power source based on detection results of the power of the modulation signal; and
 a controller configured to control on and off of transmission of the modulation signal.

(14) The communication apparatus according to (13) above, in which
 the controller turns on or off the transmission of the modulation signal with a predetermined event as a trigger.

(15) The communication apparatus according to (14) above, in which
 the controller turns off the transmission of the modulation signal with that a signal is not transmitted from the apparatus as a trigger.

(16) The communication apparatus according to (14) above, in which
 the controller turns on or off the transmission of the modulation signal with a user's operation as a trigger.

(17) The communication apparatus according to (14) above, in which
 the controller turns off the transmission of the modulation signal with that there is no data to be transmitted to the apparatus and that there is no data to be received from the different transmission apparatus as a trigger.

(18) The communication apparatus according to any one of (13) to (17) above, in which
 the modulation signal is a signal of extremely high frequency.

(19) The communication apparatus according to any one of (13) to (18) above, in which
 the electronic apparatus is an electronic apparatus to which a cable capable of supplying a power source by bus power can be connected.

(20) A control method, including
 controlling on and off of transmission of a modulation signal obtained by frequency-converting a baseband signal of a baseband into a signal of a predetermined frequency band higher than the baseband to an apparatus configured to control an electronic apparatus, the electronic apparatus being configured
  to receive the modulation signal,
  to detect power of the modulation signal, and
  to control the electronic apparatus receiving the baseband signal to start initialization processing for causing the electronic apparatus to be in a state of being capable of establishing connection or to turn on or off a power source based on detection results of the power of the modulation signal.

DESCRIPTION OF REFERENCE NUMERALS

10 USB host
11 USB connector
20 USB devices
21 USB connector
30 USB cable
31,32 USB connector
40 USB device
41 USB connector
42 power source circuit
50 millimeter wave cable
51 USB connector
52 millimeter wave connector
53 communication unit
60 millimeter wave cable
61 USB connector
62 millimeter wave connector
63 communication unit
71 transmission unit
72 reception unit
81 transmission unit
82 reception unit
91 amplifier
92 oscillator
93 mixer
94,101 amplifier
102 mixer
103 amplifier
110 millimeter wave cable
111 communication unit
120 control apparatus
121 signal power detection unit
122 controller
131 detection unit
210 USB host 211 USB interface
212 millimeter wave connector
220 USB device
221 USB interface
222 millimeter wave connector
230 millimeter wave transmission cable
231,232 millimeter wave connector
310 millimeter wave cable
311 communication unit
320 control apparatus
321 determination unit
322 controller

What is claimed is:

1. A control apparatus, comprising:
a controller configured to:
control an electronic apparatus to start initialization processing at the electronic apparatus for causing the electronic apparatus to be in a state of being capable of establishing connection, or
to control a power source to turn on or off the power source,
wherein the electronic apparatus receives a baseband signal, and
wherein the control is based on detection results of power of a modulation signal obtained by frequency-converting the baseband signal into a signal of a predetermined frequency band higher than the baseband;
a power detection unit configured to detect the power of the modulation signal; and
a reception unit configured
to receive the modulation signal, and to frequency-convert the modulation signal into the baseband signal, the power detection unit using the baseband signal obtained by frequency-converting the modulation signal to detect the power of the modulation signal.

2. The control apparatus according to claim 1, wherein the power detection unit detects a DC (Direct Current) offset of the baseband signal as the power of the modulation signal.

3. The control apparatus according to claim 1, wherein
the reception unit outputs a differential signal being the baseband signal, and
the power detection unit detects a difference between DC (Direct Current) offsets of differential signals as the power of the modulation signal.

4. The control apparatus according to claim 3, wherein
the electronic apparatus is an electronic apparatus starting the initialization processing in response to turning on of the power source, and
the controller controls the electronic apparatus to start the initialization processing by turning on the power source of the electronic apparatus.

5. The control apparatus according to claim 4, wherein
the controller turns on the power source of the electronic apparatus in a case where the power of the modulation signal has a value greater than or equal to a first threshold value, and turns off the power source of the electronic apparatus in a case where the power of the modulation signal has a value less than or equal to a second threshold value that is less than the first threshold value.

6. The control apparatus according to claim 3, wherein the modulation signal is a signal of extremely high frequency.

7. The control apparatus according to claim 3, wherein the electronic apparatus is an electronic apparatus to which a cable capable of supplying a power source by bus power can be connected.

8. A control method, comprising:
receiving a modulation signal obtained by frequency-converting a baseband signal into a signal of a predetermined frequency band higher than the baseband;
frequency-convert the modulation signal into the baseband signal;
controlling an electronic apparatus to:
start initialization processing at the electronic apparatus for causing the electronic apparatus to be in a state of being capable of establishing connection, or
to turn on or off a power source,
wherein the electronic apparatus receives the baseband signal, and
wherein the controlling is based on detection results of power of a modulation signal;
wherein the baseband signal obtained by frequency-converting the modulation signal is used to detect the power of the modulation signal.

9. A cable connected to an electronic apparatus to which a bus power cable capable of supplying a power source by bus power can be connected, the cable comprising:
a reception unit configured
to receive a modulation signal, wherein the modulation signal was obtained by frequency-converting a baseband signal into a signal of a predetermined frequency band higher than the baseband, and
to frequency-convert the modulation signal it-into the baseband signal;
a power detection unit configured to detect power of the modulation signal received by the reception unit; and
a controller configured to control the electronic apparatus receiving the baseband signal to start initialization processing for causing the electronic apparatus to be in a state of being capable of establishing connection or to turn on or off a power source based on detection results of the power of the modulation signal in the power detection unit.

10. An electronic apparatus to which a bus power cable capable of supplying a power source by bus power can be connected, the electronic apparatus comprising:
a reception unit configured
to receive a modulation signal, wherein the modulation signal was obtained by frequency-converting a baseband signal into a signal of a predetermined frequency band higher than the baseband, and
to frequency-convert the modulation signal into the baseband signal;
a power detection unit configured to detect power of the modulation signal received by the reception unit, wherein the power detection unit uses the baseband signal obtained from the reception unit to detect the power of the modulation signal; and
a controller configured to control the electronic apparatus receiving the baseband signal to start initialization processing for causing the electronic apparatus to be in a state of being capable of establishing connection or to turn on or off a power source based on detection results of the power of the modulation signal in the power detection unit.

11. A communication apparatus, comprising:
a transmission unit configured to transmit a modulation signal, wherein the modulation signal is obtained by frequency-converting a baseband signal into a signal of a predetermined frequency band higher than the baseband, to an apparatus configured
to receive the modulation signal,
to frequency-convert the modulation signal into the baseband signal,
to detect power of the modulation signal, and
to control an electronic apparatus receiving the baseband signal to start initialization processing for causing the electronic apparatus to be in a state of being capable of establishing connection, or to control a power source to turn on or off the power source, wherein the control is based on detection results of the power of the modulation signal; and
a controller configured to control on and off of transmission of the modulation signal,
wherein the baseband signal obtained by frequency-converting the modulation signal is used to detect the power of the modulation signal.

12. The communication apparatus according to claim 11, wherein
the controller turns on or off the transmission of the modulation signal with a predetermined event as a trigger.

13. The communication apparatus according to claim 12, wherein
when the controller turns off the transmission of the modulation signal then a signal is not transmitted from the apparatus as a trigger.

14. The communication apparatus according to claim 12, wherein
the controller turns on or off the transmission of the modulation signal with a user's operation as a trigger.

15. The communication apparatus according to claim 12, wherein
the controller turns off the transmission of the modulation signal with that there is no data to be transmitted to the apparatus and that there is no data to be received from the different transmission apparatus as a trigger.

16. The communication apparatus according to claim 13, wherein
the modulation signal is a signal of extremely high frequency.

17. The communication apparatus according to claim 13, wherein
the electronic apparatus is an electronic apparatus to which a cable capable of supplying a power source by bus power can be connected.

18. A control method, comprising:
controlling on and off of transmission of a modulation signal, wherein the modulation signal is obtained by frequency-converting a baseband signal into a signal of a predetermined frequency band higher than the baseband, to an apparatus configured
to control an electronic apparatus, the electronic apparatus being configured
to receive the modulation signal,
to frequency-convert the modulation signal into the baseband signal,
to detect power of the modulation signal, and
to control the electronic apparatus receiving the baseband signal to start initialization processing for causing the electronic apparatus to be in a state of being capable of establishing connection or to control a power source to turn on or off the power source based on detection results of the power of the modulation signal, wherein the baseband signal obtained by frequency-converting the modulation signal is used to detect the power of the modulation signal.

* * * * *